United States Patent
Shiga et al.

(10) Patent No.: US 10,086,236 B2
(45) Date of Patent: Oct. 2, 2018

(54) GOLF BALL RESIN COMPOSITION AND GOLF BALL

(71) Applicant: Dunlop Sports Co., Ltd., Kobe-shi, Hyogo (JP)

(72) Inventors: Kazuyoshi Shiga, Kobe (JP); Hiroshi Tadaoka, Kobe (JP); Masanori Taguchi, Kobe (JP); Takahiro Shigemitsu, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 138 days.

(21) Appl. No.: 15/196,980

(22) Filed: Jun. 29, 2016

(65) Prior Publication Data

US 2017/0001078 A1   Jan. 5, 2017

(30) Foreign Application Priority Data

Jun. 30, 2015 (JP) .................................. 2015-131213
May 23, 2016 (JP) .................................. 2016-102349

(51) Int. Cl.
| | |
|---|---|
| C08K 5/092 | (2006.01) |
| C08K 5/09 | (2006.01) |
| C08K 5/19 | (2006.01) |
| A63B 37/00 | (2006.01) |
| C08K 5/20 | (2006.01) |
| C08K 3/22 | (2006.01) |

(52) U.S. Cl.
CPC ............ *A63B 37/0039* (2013.01); *C08K 5/09* (2013.01); *C08K 5/092* (2013.01); *C08K 5/19* (2013.01); *C08K 5/20* (2013.01); *C08K 3/22* (2013.01); *C08K 2003/2224* (2013.01); *C08K 2201/014* (2013.01)

(58) Field of Classification Search
CPC combination set(s) only.
See application file for complete search history.

(56) References Cited

U.S. PATENT DOCUMENTS

| | | | |
|---|---|---|---|
| 2002/0013421 A1 | 1/2002 | Takesue et al. | |
| 2002/0099120 A1 | 7/2002 | Takesue et al. | |
| 2003/0050373 A1 | 3/2003 | Chen | |
| 2004/0106736 A1 | 6/2004 | Takesue et al. | |
| 2009/0118040 A1* | 5/2009 | De Garavilla ........... | C08K 5/09 473/373 |
| 2009/0247323 A1* | 10/2009 | Rajagopalan ...... | A63B 37/0043 473/373 |
| 2013/0079178 A1 | 3/2013 | Shiga et al. | |
| 2014/0274469 A1* | 9/2014 | Kennedy, III ....... | A63B 37/007 473/372 |

FOREIGN PATENT DOCUMENTS

| | | |
|---|---|---|
| JP | 2001-348467 A | 12/2001 |
| JP | 2002-219195 A | 8/2002 |
| JP | 2004-180725 A | 7/2004 |
| JP | 2004-524418 A | 8/2004 |
| JP | 2013-78563 A | 5/2013 |

* cited by examiner

*Primary Examiner* — David J Buttner
(74) *Attorney, Agent, or Firm* — Birch, Stewart, Kolasch & Birch LLP

(57) ABSTRACT

An object of the present invention is to provide a golf ball resin composition having high resilience and flexibility. The present invention provides a golf ball resin composition, comprising (A) at least one resin component selected from the group consisting of (a-1) a binary copolymer, (a-2) an ionomer resin consisting of a metal ion-neutralized product of a binary copolymer, (a-3) a ternary copolymer, and (a-4) an ionomer resin consisting of a metal ion-neutralized product of a ternary copolymer, (B) a saturated fatty acid, (C) an unsaturated fatty acid, and (D) an unsaturated aliphatic polycarboxylic acid; comprising (B) the saturated fatty acid, (C) the unsaturated fatty acid and (D) the unsaturated aliphatic polycarboxylic acid in a total amount ranging from 80 parts by mass to 200 parts by mass with respect to 100 parts by mass of (A) the resin component; and having a neutralization degree of more than 80 mole %.

19 Claims, 1 Drawing Sheet

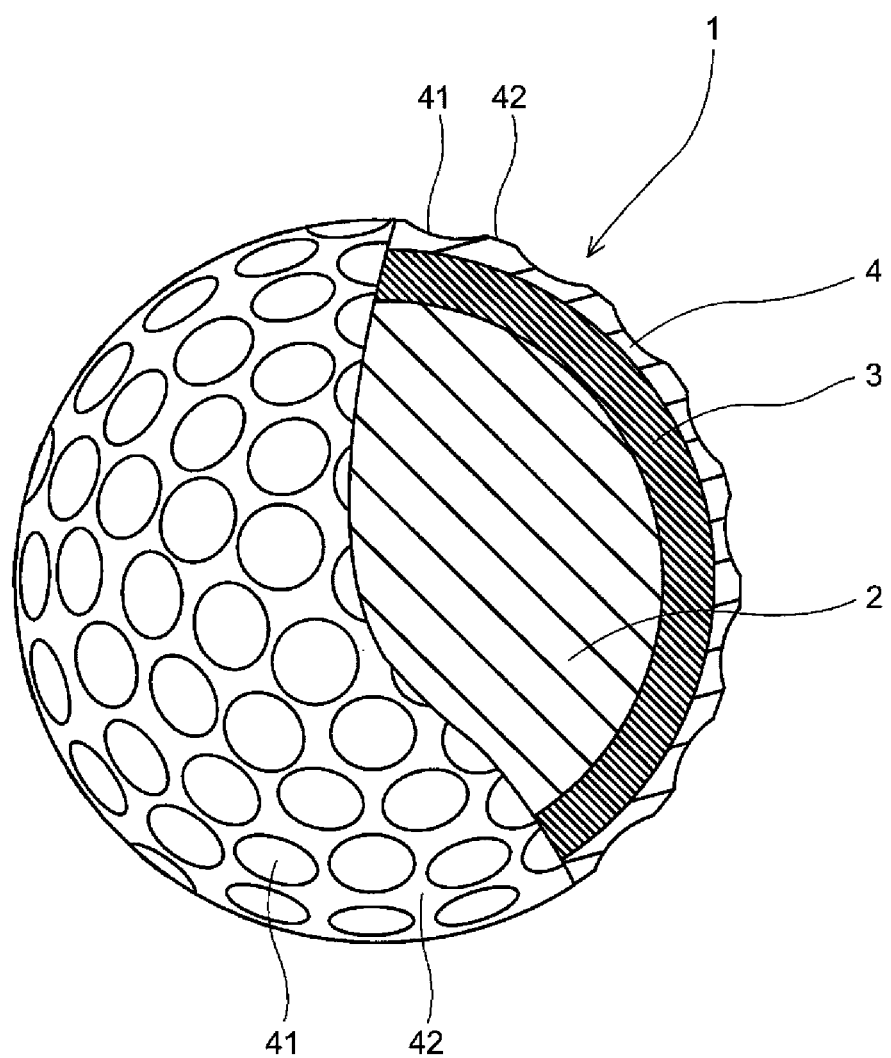

GOLF BALL RESIN COMPOSITION AND GOLF BALL

FIELD OF THE INVENTION

The present invention relates to a golf ball resin composition and a golf ball using the golf ball resin composition.

DESCRIPTION OF THE RELATED ART

Examples of a golf ball include a two-piece golf ball comprising a core and a cover; a three-piece golf ball comprising a core, one intermediate layer covering the core, and a cover covering the intermediate layer; and a multi-piece golf ball comprising a core, at least two intermediate layers covering the core, and a cover covering the intermediate layers. Examples of a material constituting each layer of the golf ball include an ionomer resin. The ionomer resin has high stiffness, and thus a golf ball travelling a great distance is obtained if the ionomer resin is used for a golf ball constituent member. Therefore, the ionomer resin is widely used as a material constituting the intermediate layer or cover of the golf ball.

For example, Japanese Patent Publication No. 2004-524418 A discloses a composition comprising a thermoplastic composition that is melt processable consisting essentially of: (a) a thermoplastic composition comprising an E/X/Y copolymer (where E is ethylene, X is an ethylenically $\alpha,\beta$-unsaturated carboxylic acid having 3 to 8 carbon atoms, and Y is a softening comonomer selected from alkyl acrylate and alkyl methacrylate wherein the alkyl group has 1 to 8 carbon atoms.), wherein a. the E/X/Y copolymer has a melt index of at least 75 grams per ten minutes measured in accord with ASTM D-1238, condition E, at 190° C. using a weight of 2160 grams, b. X is about 2 to 30 wt % of the E/X/Y copolymer and Y is about 17 to 40 wt % of the E/X/Y copolymer, and c. at least 55% of X is neutralized by one or more cations of an alkali metal, a transition metal or an alkaline earth metal; and (b) one or more aliphatic mono-functional organic acids having fewer than 36 carbon atoms or salts thereof in an amount of about 5 to 50 wt % based on total of (a) and (b), wherein greater than 80% of all the acids of (a) and of (b) is neutralized by one or more cations of an alkali metal, a transition metal or an alkaline earth metal.

Japanese Patent Publication No. 2002-219195 A discloses a golf ball material which is a mixture comprising, as essential components, 100 parts by mass of a resin component containing a base resin and (e) a non-ionomer thermoplastic elastomer in a mass ratio of 100:0 to 50:50, (c) 5 to 80 parts by mass of a fatty acid having a molecular weight of 280 to 1500 and/or a derivative thereof, and (d) 0.1 to 10 parts by mass of a basic inorganic metal compound capable of neutralizing acidic groups left unneutralized in the base resin and the component (c), wherein the base resin contains (a) an olefin-unsaturated carboxylic acid binary random copolymer and/or a metal-ion neutralized product of an olefin-unsaturated carboxylic acid binary random copolymer and (b) an olefin-unsaturated carboxylic acid-unsaturated carboxylic acid ester ternary random copolymer and/or a metal-ion neutralized product of an olefin-unsaturated carboxylic acid-unsaturated carboxylic acid ester ternary random copolymer in a mass ratio of 100:0 to 25:75.

Japanese Patent Publication No. 2004-180725 A discloses a golf ball comprising a core and two or more covers covering the core, wherein the first cover is formed mainly from (a) a non-ionomer thermoplastic elastomer and (b) a mixture of (b-1) an isocyanate compound and (b-2) a thermoplastic resin which does not substantially react with an isocyanate, and the second cover is formed mainly from a mixture comprising a resin component containing (c) a base resin and (d) a non-ionomer thermoplastic elastomer in a mass ratio of 100:0 to 50:50 (e) a fatty acid having 18 to 80 carbon atoms and/or a derivate thereof, (f) a metal ion source capable of neutralizing acidic groups left unneutralized in the component (c) and the component (e), and (g) a compound having two or more reactive functional groups and a molecular weight of twenty thousand or less, wherein (c) the base resin is one or two or more selected from the group consisting of (c-1) an olefin-unsaturated carboxylic acid binary random copolymer and a metal-ion neutralized product of an olefin-unsaturated carboxylic acid binary random copolymer and (c-2) an olefin-unsaturated carboxylic acid-unsaturated carboxylic acid ester ternary random copolymer and a metal-ion neutralized product of an olefin-unsaturated carboxylic acid-unsaturated carboxylic acid ester ternary random copolymer, and the first cover and the second cover are adjacent to each other.

Japanese Patent Publication No. 2001-348467 A discloses a golf ball resin composition comprising: 100 parts by mass of (A) at least one thermoplastic resin component selected from the group consisting of (a-1) an olefin-unsaturated carboxylic acid random copolymer and/or an olefin-unsaturated carboxylic acid-unsaturated carboxylic acid ester ternary copolymer, (a-2) a metal-ion neutralized product of an olefin-unsaturated carboxylic acid random copolymer and/or a metal-ion neutralized product of an olefin-unsaturated carboxylic acid-unsaturated carboxylic acid ester ternary copolymer, and (a-3) a thermoplastic elastomer; and 0.1 to 10 parts by mass of (B) at least one wax component selected from the group consisting of (b-1) a fatty acid having 20 to 80 carbon atoms and/or a derivate thereof, and (b-2) a natural wax oxide and/or a natural wax derivate, having a neutralization number of 60 to 190 mgKOH/g.

Japanese Patent Publication No. 2013-78563 A discloses a golf ball resin composition comprising: (A) at least one selected from the group consisting of (a-1) a binary copolymer composed of an olefin and an $\alpha,\beta$-unsaturated carboxylic acid having 3 to 8 carbon atoms, (a-2) a metal ion-neutralized product of a binary copolymer composed of an olefin and an $\alpha,\beta$-unsaturated carboxylic acid having 3 to 8 carbon atoms, (a-3) a ternary copolymer composed of an olefin, an $\alpha,\beta$-unsaturated carboxylic acid having 3 to 8 carbon atoms and an $\alpha,\beta$-unsaturated carboxylic acid ester, and (a-4) a metal ion-neutralized product of a ternary copolymer composed of an olefin, an $\alpha,\beta$-unsaturated carboxylic acid having 3 to 8 carbon atoms and an $\alpha,\beta$-unsaturated carboxylic acid ester; and (B) a compound having a hydrocarbon chain, a cationic moiety and an anionic moiety in its molecule.

SUMMARY OF THE INVENTION

A golf ball travelling a great distance and having a good shot feeling is desired, and thus it is necessary for a golf ball resin composition to have both high resilience and flexibility. Further, a strong impact is given to a golf ball when the golf ball is being hit, and thus a golf ball having good durability is desired. However, the conventional golf ball resin compositions do not provide all of resilience, flexibility and durability at the required level.

The present invention has been achieved in view of the above problems. An object of the present invention is to provide a golf ball resin composition having high resilience and flexibility. Another object of the present invention is to provide a golf ball having excellent resilience, shot feeling and durability by using the golf ball resin composition.

The present invention that has solved the above problems provides a golf ball resin composition, comprising (A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, (B) a saturated fatty acid, (C) an unsaturated fatty acid, and (D) an unsaturated aliphatic polycarboxylic acid; comprising (B) the saturated fatty acid, (C) the unsaturated fatty acid and (D) the unsaturated aliphatic polycarboxylic acid in a total amount ranging from 80 parts by mass to 200 parts by mass with respect to 100 parts by mass of (A) the resin component; and having a neutralization degree of more than 80 mole %.

The present invention further provides a golf ball comprising a spherical core, at least one intermediate layer covering the spherical core, and a cover covering the intermediate layer, wherein at least one of the intermediate layers is formed from the above golf ball resin composition.

According to the present invention, a golf ball resin composition having excellent resilience and flexibility is obtained. Further, use of the inventive golf ball resin composition provides a golf ball having excellent resilience, shot feeling and durability.

BRIEF DESCRIPTION OF THE DRAWINGS

FIG. 1 is a partially cutaway view of a golf ball of one embodiment according to the present invention.

DESCRIPTION OF THE PREFERRED EMBODIMENT

The present invention provides a golf ball resin composition, comprising (A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, (B) a saturated fatty acid, (C) an unsaturated fatty acid, and (D) an unsaturated aliphatic polycarboxylic acid; comprising (B) the saturated fatty acid, (C) the unsaturated fatty acid and (D) the unsaturated aliphatic polycarboxylic acid in a total amount ranging from 80 parts by mass to 200 parts by mass with respect to 100 parts by mass of (A) the resin component; and having a neutralization degree of more than 80 mole %.

A golf ball resin composition comprises a base resin which is a main agent, and where necessary an additive and a coloring agent. The golf ball resin composition according to the present invention comprises (A) a resin component as the base resin, and comprises (B) a saturated fatty acid, (C) an unsaturated fatty acid and (D) an unsaturated aliphatic polycarboxylic acid as the additive.

[(A) Resin Component]

The (a-1) component is a nonionic binary copolymer composed of an olefin and an α,β-unsaturated carboxylic acid having 3 to 8 carbon atoms wherein carboxyl groups thereof are not neutralized. In addition, the (a-2) component is an ionomer resin obtained by neutralizing at least a part of carboxyl groups in a binary copolymer composed of an olefin and α,β-unsaturated carboxylic acid having 3 to 8 carbon atoms with a metal ion.

The (a-3) component is a nonionic ternary copolymer composed of an olefin, an α,β-unsaturated carboxylic acid having 3 to 8 carbon atoms and an α,β-unsaturated carboxylic acid ester wherein carboxyl groups thereof are not neutralized. In addition, the (a-4) component is an ionomer resin obtained by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion.

It is noted that, in the present invention, "(a-1) a binary copolymer composed of an olefin and an α,β-unsaturated carboxylic acid having 3 to 8 carbon atoms" is sometimes simply referred to as "(a-1) a binary copolymer", "(a-2) an ionomer resin consisting of a metal ion-neutralized product of a binary copolymer composed of an olefin and an α,β-unsaturated carboxylic acid having 3 to 8 carbon atoms" is sometimes simply referred to as "(a-2) a binary ionomer resin", "(a-3) a ternary copolymer composed of an olefin, an α,β-unsaturated carboxylic acid having 3 to 8 carbon atoms and an α,β-unsaturated carboxylic acid ester" is sometimes simply referred to as "(a-3) a ternary copolymer", and "(a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester" is sometimes simply referred to as "(a-4) a ternary ionomer resin".

The olefin is preferably an olefin having 2 to 8 carbon atoms. Examples of the olefin include ethylene, propylene, butene, pentene, hexene, heptene and octane, and ethylene is particularly preferred. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferred. In addition, examples of the α,β-unsaturated carboxylic acid ester include methyl ester, ethyl ester, propyl ester, n-butyl ester, isobutyl ester of acrylic acid, methacrylic acid, fumaric acid and maleic acid, and acrylic acid ester or methacrylic acid ester is particularly preferred.

Preferable examples of (a-1) the binary copolymer include a binary copolymer composed of ethylene and (meth)acrylic acid, and preferable examples of (a-2) the binary ionomer resin include a metal ion-neutralized product of a binary copolymer composed of ethylene and (meth)acrylic acid. Preferable examples of (a-3) the ternary copolymer include a ternary copolymer composed of ethylene, (meth)acrylic acid and (meth)acrylic acid ester, and preferable examples of (a-4) the ternary ionomer resin include a metal ion-neutralized product of a ternary copolymer composed of ethylene, (meth)acrylic acid and (meth)acrylic acid ester. Here, (meth)acrylic acid means acrylic acid and/or methacrylic acid.

The content of the α,β-unsaturated carboxylic acid component having 3 to 8 carbon atoms in the (a-1) the binary copolymer or (a-3) the ternary copolymer is preferably 4 mass % or more, more preferably 7 mass % or more, even more preferably 8 mass % or more, particularly preferably 9 mass % or more, and is preferably 30 mass % or less, more preferably 25 mass % or less, particularly preferably 20 mass % or less.

The melt flow rate (190° C., 2.16 kgf) of the (a-1) the binary copolymer or (a-3) the ternary copolymer is preferably 5 g/10 min or more, more preferably 10 g/10 min or more, even more preferably 15 g/10 min or more, and is preferably 1,700 g/10 min or less, more preferably 1,500 g/10 min or less, even more preferably 1,300 g/10 min or less. If the melt flow rate (190° C., 2.16 kgf) of (a-1) the binary copolymer or (a-3) the ternary copolymer is 5 g/10 min or more, the golf ball resin composition has better fluidity, and thus the constituent member may be easily molded. In addition, if the melt flow rate (190° C., 2.16 kgf) of (a-1) the binary copolymer or (a-3) the ternary copolymer is 1700 g/10 min or less, the obtained golf ball has better durability.

Specific examples of (a-1) the binary copolymer include an ethylene-methacrylic acid copolymer having a trade name of "NUCREL (registered trademark) (e.g. "NUCREL N1560", "NUCREL N2060", "NUCREL N1108C", "NUCREL N0908C", "NUCREL N1050H", "NUCREL N2050H", "NUCREL N1110H" and "NUCREL N0200H")" commercially available from Mitsui-Du Pont Polychemicals Co., Ltd; and an ethylene-acrylic acid copolymer having a trade name of "PRIMACOR (registered trademark) 5980I" commercially available from Dow Chemical Company.

Specific examples of (a-3) the ternary copolymer include "NUCREL (registered trademark) (e.g. "NUCREL AN4318" and "NUCREL AN4319")" commercially available from Mitsui-Du Pont Polychemicals Co., Ltd; "NUCREL (registered trademark) (e.g. "NUCREL AE")" commercially available from E.I. du Pont de Nemours and Company; and "PRIMACOR (registered trademark) (e.g. "PRIMACOR AT310" and "PRIMACOR AT320")" commercially available from Dow Chemical Company. (a-1) The binary copolymer or (a-3) the ternary copolymer may be used solely, or at least two of them may be used in combination.

The amount of the α,β-unsaturated carboxylic acid component having 3 to 8 carbon atoms in the (a-2) the binary ionomer resin is preferably 4 mass % or more, more preferably 7 mass % or more, even more preferably 8 mass % or more, particularly preferably 9 mass % or more, and is preferably 30 mass % or less, more preferably 25 mass % or less, particularly preferably 20 mass % or less. If the amount of the α,β-unsaturated carboxylic acid component having 3 to 8 carbon atoms is 4 mass % or more, the constituent member having a desired hardness may be easily formed. In addition, if the amount of the α,β-unsaturated carboxylic acid component having 3 to 8 carbon atoms is 30 mass % or less, the obtained constituent member has better durability and shot feeling since the hardness thereof does not become excessively high.

The neutralization degree of the carboxyl group of (a-2) the binary ionomer resin is preferably 15 mole % or more, more preferably 20 mole % or more, even more preferably 25 mole % or more, and is preferably 90 mole % or less, more preferably 80 mole % or less, even more preferably 70 mole % or less. If the neutralization degree is 15 mole % or more, the obtained golf ball has better resilience and durability. On the other hand, if the neutralization degree is 90 mole % or less, the golf ball resin composition has better fluidity (good moldability). It is noted that the neutralization degree of the carboxyl group of (a-2) the binary ionomer resin may be calculated by the following expression.

Neutralization degree of binary ionomer resin (mole %)=100×(mole number of neutralized carboxyl groups in binary ionomer resin/mole number of all carboxyl groups in binary ionomer resin)

Examples of the metal ion for neutralizing at least a part of carboxyl groups of (a-2) the binary ionomer resin include monovalent metal ions such as sodium, potassium, lithium and the like; divalent metals ions such as magnesium, calcium, zinc, barium, cadmium and the like; trivalent metals ions such as aluminum and the like; and other ions such as tin, zirconium and the like.

Specific examples of (a-2) the binary ionomer resin include "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), and Himilan AM7329 (Zn))" commercially available from Mitsui-Du Pont Polychemicals Co., Ltd.

Specific examples of (a-2) the binary ionomer resin further include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), and Surlyn AD8546 (Li))" commercially available from E.I. du Pont de Nemours and Company.

Specific examples of (a-2) the binary ionomer resin further include "Iotek (registered trademark) (e.g. Iotek 8000 (Na), Iotek 8030 (Na), Iotek 7010 (Zn), and Iotek 7030 (Zn))" commercially available from ExxonMobil Chemical Corporation.

(a-2) The binary ionomer resin exemplified above may be used alone or as a mixture of at least two of them. It is noted that Na, Zn, Li, Mg and the like described in the parentheses after the trade names indicate metal types of neutralizing metal ions of the binary ionomer resins.

The bending stiffness of (a-2) the binary ionomer resin is preferably 140 MPa or more, more preferably 150 MPa or more, even more preferably 160 MPa or more, and is preferably 550 MPa or less, more preferably 500 MPa or less, even more preferably 450 MPa or less. If the bending stiffness of (a-2) the binary ionomer resin is excessively low, the spin rate of the golf ball may increase and thus the flight distance of the golf ball may be lowered, and if the bending stiffness of (a-2) the binary ionomer resin is excessively high, the durability of the golf ball may be lowered.

The melt flow rate (190° C., 2.16 kgf) of (a-2) the binary ionomer resin is preferably 0.1 g/10 min or more, more preferably 0.5 g/10 min or more, even more preferably 1.0 g/10 min or more, and is preferably 30 g/10 min or less, more preferably 20 g/10 min or less, even more preferably 15 g/10 min or less. If the melt flow rate (190° C., 2.16 kgf) of (a-2) the binary ionomer resin is 0.1 g/10 min or more, the golf ball resin composition has better fluidity, and thus, for example, a thin layer may be easily molded. In addition, if the melt flow rate (190° C., 2.16 kgf) of (a-2) the binary ionomer resin is 30 g/10 min or less, the obtained golf ball has better durability.

The slab hardness of (a-2) the binary ionomer resin is preferably 50 or more, more preferably 55 or more, even more preferably 60 or more, and is preferably 75 or less, more preferably 73 or less, even more preferably 70 or less in Shore D hardness. If the slab hardness is 50 or more in Shore D hardness, the obtained constituent member has a high hardness. In addition, if the slab hardness is 75 or less in Shore D hardness, the obtained constituent member does not become excessively hard, and thus the golf ball has better durability.

The amount of the α,β-unsaturated carboxylic acid component having 3 to 8 carbon atoms in (a-4) the ternary ionomer resin is preferably 2 mass % or more, more preferably 3 mass % or more, even more preferably 4 mass % or more, and is preferably 30 mass % or less, more preferably 25 mass % or less, even more preferably 20 mass % or less.

The neutralization degree of the carboxyl group of (a-4) the ternary ionomer resin is preferably 15 mole % or more, more preferably 20 mole % or more, even more preferably 25 mole % or more, and is preferably 90 mole % or less, more preferably 80 mole % or less, even more preferably 70 mole % or less. If the neutralization degree is 15 mole % or more, the obtained golf ball has better resilience and durability. On the other hand, if the neutralization degree is 90 mole % or less, the golf ball resin composition has better fluidity (good moldability). It is noted that the neutralization degree of the carboxyl group of (a-4) the ternary ionomer resin may be calculated by the following expression.

Neutralization degree of ternary ionomer resin (mole %)=100×(mole number of neutralized carboxyl groups in ternary ionomer resin/mole number of all carboxyl groups in ternary ionomer resin)

Examples of the metal ion for neutralizing at least a part of carboxyl groups of (a-4) the ternary ionomer resin include monovalent metal ions such as sodium, potassium, lithium and the like; divalent metals ions such as magnesium, calcium, zinc, barium, cadmium and the like; trivalent metals ions such as aluminum and the like; and other ions such as tin, zirconium and the like.

Specific examples of (a-4) the ternary ionomer resin include "Himilan (registered trademark) (e.g. Himilan AM7327 (Zn), Himilan 1855 (Zn), Himilan 1856 (Na), and Himilan AM7331 (Na))" commercially available from Mitsui-Du Pont Polychemicals Co., Ltd; "Surlyn 6320 (Mg), Surlyn 8120 (Na), Surlyn 8320 (Na), Surlyn 9320 (Zn), Surlyn 9320W (Zn), HPF 1000 (Mg), and HPF 2000 (Mg)" commercially available from E.I. du Pont de Nemours and Company; and "Iotek 7510 (Zn) and Iotek 7520 (Zn)" commercially available from ExxonMobil Chemical Corporation. It is noted that Na, Zn, Mg and the like described in the parentheses after the trade names indicate metal types of neutralizing metal ions of the ternary ionomer resins. (a-4) The ternary ionomer resin may be used alone, or at least two of them may be used in combination.

The bending stiffness of (a-4) the ternary ionomer resin is preferably 10 MPa or more, more preferably 11 MPa or more, even more preferably 12 MPa or more, and is preferably 100 MPa or less, more preferably 97 MPa or less, even more preferably 95 MPa or less. If the bending stiffness of (a-4) the ternary ionomer resin is excessively low, the spin rate of the golf ball may increase and thus the flight distance of the golf ball may be lowered, and if the bending stiffness of (a-4) the ternary ionomer resin is excessively high, the durability of the golf ball may be lowered.

The melt flow rate (190° C., 2.16 kgf) of (a-4) the ternary ionomer resin is preferably 0.1 g/10 min or more, more preferably 0.3 g/10 min or more, even more preferably 0.5 g/10 min or more, and is preferably 20 g/10 min or less, more preferably 15 g/10 min or less, even more preferably 10 g/10 min or less. If the melt flow rate (190° C., 2.16 kgf) of (a-4) the ternary ionomer resin is 0.1 g/10 min or more, the golf ball resin composition has better fluidity, and thus a thin layer may be easily molded. In addition, if the melt flow rate (190° C., 2.16 kgf) of (a-4) the ternary ionomer resin is 20 g/10 min or less, the obtained golf ball has better durability.

The slab hardness of (a-4) the ternary ionomer resin is preferably 20 or more, more preferably 25 or more, even more preferably 30 or more, and is preferably 70 or less, more preferably 65 or less, even more preferably 60 or less in Shore D hardness. If the slab hardness is 20 or more in Shore D hardness, the obtained constituent member does not become excessively soft, and thus the golf ball has a better resilience. In addition, if the slab hardness is 70 or less in Shore D hardness, the obtained constituent member does not become excessively hard, and thus the golf ball has better durability.

As (A) the resin component, (a-1) the binary copolymer, (a-2) the binary ionomer resin, (a-3) the ternary copolymer and (a-4) the ternary ionomer resin may be used solely, or at least two of them may be used in combination.

[(B) Saturated Fatty Acid]

(B) The saturated fatty acid is an aliphatic monocarboxylic acid not having an unsaturated bond in the hydrocarbon chain. (B) The saturated fatty acid has a similar structure to the polyolefin chain moiety of (A) the resin component which is a base resin, and thus has a high affinity to the polyolefin chain moiety of (A) the resin component. Accordingly, it is considered that (B) the saturated fatty acid is mainly dispersed in the matrix of (A) the resin component to improve the bending stiffness of the resin. (B) The saturated fatty acid may be a linear saturated fatty acid or a branched saturated fatty acid, and the linear saturated fatty acid is preferred since it has a higher affinity to the polyolefin chain moiety of (A) the resin component which is a base resin.

(B) The saturated fatty acid preferably has, but is not particularly limited to, 4 or more carbon atoms, more preferably 12 or more carbon atoms, even more preferably 16 or more carbon atoms, and preferably has 30 or less carbon atoms, more preferably 28 or less carbon atoms, even more preferably 26 or less carbon atoms.

Specific examples of (B) the saturated fatty acid (IUPAC name) include butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecanoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), and triacontanoic acid (C30).

Specific examples of (B) the saturated fatty acid (common name) include butyric acid (C4), valeric acid (C5), caproic acid (C6), enanthic acid (C7), caprylic acid (C8), pelargonic acid (C9), capric acid (C10), lauric acid (C12), myristic acid (C14), pentadecylic acid (C15), palmitic acid (C16), margaric acid (C17), stearic acid (C18), arachidic acid (C20), behenic acid (C22), lignoceric acid (C24), cerotic acid (C26), montanic acid (C28), and melissic acid (C30).

(B) The saturated fatty acid may be used solely, or at least two of them may be used in combination. Among them, preferable examples of (B) the saturated fatty acid include palmitic acid, stearic acid, arachidic acid, behenic acid, lignoceric acid and montanic acid.

The amount of (B) the saturated fatty acid is preferably 10 parts by mass or more, more preferably 20 parts by mass or more, even more preferably 30 parts by mass or more, and is preferably 200 parts by mass or less, more preferably 150 parts by mass or less, even more preferably 100 parts by mass or less, with respect to 100 parts by mass of (A) the resin component. If the amount of the component (B) is 10 parts by mass or more, the resultant resin composition has greater bending stiffness, and better fluidity and flexibility. In addition, if the amount of the component (B) is 200 parts by mass or less, lowering in the durability of the golf ball caused by the increased amount of low molecular weight components may be suppressed.

As (B) the saturated fatty acid, a salt of a saturated fatty acid may be used. Examples of the cation component of the saturated fatty acid salt include a metal ion, an ammonium ion, and an organic cation. Examples of the metal ion include a monovalent metal ion such as sodium, potassium, lithium and silver; a divalent metal ion such as magnesium, calcium, zinc, barium, cadmium, copper, cobalt, nickel and manganese; a trivalent metal ion such as aluminum and iron; and other ion such as tin, zirconium and titanium. The cation component may be used solely, or at least two of them may be used in combination.

[(C) Unsaturated Fatty Acid]

(C) The unsaturated fatty acid is an aliphatic monocarboxylic acid having at least one unsaturated bond in the hydrocarbon chain. The molecular chain of (C) the unsaturated fatty acid bends, for example, in a shape of "V" letter, at the unsaturated bond of the hydrocarbon chain. Accordingly, (C) the unsaturated fatty acid has a lower affinity to the polyolefin chain moiety of (A) the resin component, compared to (B) the saturated fatty acid. It is considered that (C) the unsaturated fatty acid is mainly taken into the ion association of (A) the resin component to improve the rebound resilience of the resin. Examples of the unsaturated bond include a carbon-carbon double bond and a carbon-carbon triple bond, and the carbon-carbon double bond is preferred since the molecular chain easily bends. In addition, examples of the carbon-carbon double bond include a cis-double bond and a trans-double bond, and the cis-double bond is more preferred.

(C) The unsaturated fatty acid is preferably a linear unsaturated fatty acid. The linear unsaturated fatty acid preferably has 4 or more carbon atoms, more preferably 12 or more carbon atoms, even more preferably 16 or more carbon atoms, and preferably has 30 or less carbon atoms, more preferably 28 or less carbon atoms, even more preferably 26 or less carbon atoms.

(C) The unsaturated fatty acid preferably has one or more and six or less carbon-carbon double bonds, more preferably five or less carbon-carbon double bonds, even more preferably four or less carbon-carbon double bonds. When (C) the unsaturated fatty acid is a linear unsaturated fatty acid having 12 or more carbon atoms, the unsaturated fatty acid preferably has the first carbon-carbon double bond located at the third or later carbon, more preferably located at the fifth or later carbon, even more preferably located at the sixth or later carbon, counted from the methyl side which is the end of the unsaturated fatty acid.

Specific examples of (C) the unsaturated fatty acid (IUPAC name) include butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), pentacosenoic acid (C25), hexacosenoic acid (C26), heptacosenoic acid (C27), octacosenoic acid (C28), nonacosenoic acid (C29), and triacontenoic acid (C30).

Specific examples of (C) the unsaturated fatty acid (common name) include myristoleic acid (C14, monounsaturated fatty acid, n-5), palmitoleic acid (C16, monounsaturated fatty acid, n-7), stearidonic acid (C18, tetraunsaturated fatty acid, n-3), vaccenic acid (C18, monounsaturated fatty acid, n-7), oleic acid (C18, monounsaturated fatty acid, n-9), elaidic acid (C18, monounsaturated fatty acid, n-9), linoleic acid (C18, diunsaturated fatty acid, n-6), α-linolenic acid (C18, triunsaturated fatty acid, n-3), γ-linolenic acid (C18, triunsaturated fatty acid, n-6), gadoleic acid (C20, monounsaturated fatty acid, n-11), eicosenoic acid (C20, monounsaturated fatty acid, n-11), eicosadienoic acid (C20, diunsaturated fatty acid, n-6), arachidonic acid (C20, tetraunsaturated fatty acid, n-6), eicosapentaenoic acid (C20, pentaunsaturated fatty acid, n-3), erucic acid (C22, monounsaturated fatty acid, n-9), docosahexaenoic acid (C22, hexaunsaturated fatty acid, n-3), and nervonic acid (C24, monounsaturated fatty acid, n-9). It is noted that n-5 or the like described in the parentheses after the compound names indicates the carbon position where the first carbon-carbon double bond is located, counting from the methyl group side which is the end of the unsaturated fatty acid.

(C) The unsaturated fatty acid may be used solely, or at least two of them may be used in combination. Among them, preferable examples of (C) the unsaturated fatty acid include palmitoleic acid (C16, cis-9-monounsaturated fatty acid, n-7), oleic acid (C18, cis-9-monounsaturated fatty acid, n-9), linoleic acid (C18, cis-9-cis-12-diunsaturated fatty acid, n-6), and arachidonic acid (C20,5,8,11,14-tetraunsaturated fatty acid, n-6).

The amount of (C) the unsaturated fatty acid is preferably 30 parts by mass or more, more preferably 50 parts by mass or more, even more preferably 70 parts by mass or more, and is preferably 200 parts by mass or less, more preferably 150 parts by mass or less, even more preferably 120 parts by mass or less, with respect to 100 parts by mass of (A) the resin component. If the amount of the component (C) is 30 parts by mass or more, the resultant resin composition has greater rebound resilience, and better fluidity and flexibility. In addition, if the amount of the component (C) is 200 parts by mass or less, lowering in the durability of the golf ball caused by the increased amount of low molecular weight components may be suppressed.

As (C) the unsaturated fatty acid, a salt of an unsaturated fatty acid may be used. Examples of the cation component of the unsaturated fatty acid salt include a metal ion, an ammonium ion, and an organic cation. Examples of the metal ion include a monovalent metal ion such as sodium, potassium, lithium and silver; a divalent metal ion such as magnesium, calcium, zinc, barium, cadmium, copper, cobalt, nickel and manganese; a trivalent metal ion such as aluminum and iron; and other ion such as tin, zirconium and titanium. The cation component may be used solely, or at least two of them may be used in combination.

[(D) Unsaturated Aliphatic Polycarboxylic Acid]

(D) The unsaturated aliphatic polycarboxylic acid is an aliphatic polycarboxylic acid having at least one unsaturated bond in the hydrocarbon chain and at least two carboxyl groups. (D) The unsaturated aliphatic polycarboxylic acid has a similar structure to (C) the unsaturated fatty acid, and thus functions to improve the rebound resilience of (A) the resin component, similarly to (C) the unsaturated fatty acid. Further, (D) the unsaturated aliphatic polycarboxylic acid has multiple carboxyl groups, and thus bonds to the neighboring ion associations. As a result, the breaking stress and breaking strain of (A) the resin component are improved, and the resultant resin composition has excellent elongation.

(D) The unsaturated aliphatic polycarboxylic acid is preferably a multimeric compound of a linear unsaturated fatty acid, more preferably a dimer and/or a trimer. The linear unsaturated fatty acid constituting (D) the unsaturated aliphatic polycarboxylic acid preferably has 4 or more carbon atoms, more preferably 12 or more carbon atoms, even more preferably 16 or more carbon atoms, and preferably has 30 or less carbon atoms, more preferably 28 or less carbon atoms, even more preferably 26 or less carbon atoms.

The linear unsaturated fatty acid constituting (D) the unsaturated aliphatic polycarboxylic acid preferably has one or more and six or less carbon-carbon double bonds, more preferably five or less carbon-carbon double bonds, even more preferably four or less carbon-carbon double bonds. When the linear unsaturated fatty acid constituting (D) the unsaturated aliphatic polycarboxylic acid is a linear unsaturated fatty acid having 12 or more carbon atoms, the unsaturated fatty acid preferably has the first carbon-carbon double bond located at the third or later carbon, more preferably located at the fifth or later carbon, even more preferably located at the sixth or later carbon, counting from the methyl group side which is the end of the unsaturated fatty acid.

The acid value of (D) the unsaturated aliphatic polycarboxylic acid is preferably 124 mgKOH/g or more, more preferably 133 mgKOH/g or more, even more preferably 142 mgKOH/g or more, and is preferably 652 mgKOH/g or less, more preferably 283 mgKOH/g or less, even more preferably 221 mgKOH/g or less.

Specific examples of (D) the unsaturated aliphatic polycarboxylic acid include a dimer and/or trimer of 3-octenoic acid, a dimer and/or trimer of 10-undecenoic acid, a dimer and/or trimer of palmitoleic acid, a dimer and/or trimer of oleic acid, a dimer and/or trimer of elaidic acid, a dimer and/or trimer of linoleic acid, a dimer and/or trimer of linolenic acid, and a dimer and/or trimer of arachidonic acid.

(D) The unsaturated aliphatic polycarboxylic acid may be used solely, or at least two of them may be used in combination. Among them, preferable examples of (D) the unsaturated aliphatic polycarboxylic acid include a dimer and/or trimer of at least one selected from the group consisting of palmitoleic acid, oleic acid, linoleic acid and arachidonic acid.

The amount of (D) the unsaturated aliphatic polycarboxylic acid is preferably 2 parts by mass or more, more preferably 5 parts by mass or more, even more preferably 10 parts by mass or more, and is preferably 100 parts by mass or less, more preferably 90 parts by mass or less, even more preferably 80 parts by mass or less, with respect to 100 parts by mass of (A) the resin component. If the amount of the component (D) is 2 parts by mass or more, the resultant resin composition has greater breaking strain and breaking stress, and thus the golf ball has better durability. In addition, if the amount of the component (D) is 100 parts by mass or less, the resultant resin composition has better fluidity and moldability.

The total amount of (B) the saturated fatty acid, (C) the unsaturated fatty acid and (D) the unsaturated aliphatic polycarboxylic acid in the golf ball resin composition is preferably 80 parts by mass or more, more preferably 90 parts by mass or more, even more preferably 100 parts by mass or more, and is preferably 200 parts by mass or less, more preferably 180 parts by mass or less, even more preferably 160 parts by mass or less, with respect to 100 parts by mass of (A) the resin component. If the total amount of (B) the saturated fatty acid, (C) the unsaturated fatty acid and (D) the unsaturated aliphatic polycarboxylic acid is 80 parts by mass or more, the resultant resin composition has better rebound resilience, bending stiffness, fluidity and flexibility. In addition, if the total amount of (B) the saturated fatty acid, (C) the unsaturated fatty acid and (D) the unsaturated aliphatic polycarboxylic acid is 200 parts by mass or less, lowering in the durability of the golf ball caused by the increased amount of low molecular weight components may be suppressed.

In the golf ball resin composition, the mass ratio [(B)/{(C)+(D)}] of (B) the saturated fatty acid to a sum of (C) the unsaturated fatty acid and (D) the unsaturated aliphatic polycarboxylic acid is preferably 10/90 or more, more preferably 15/85 or more, even more preferably 20/80 or more, and is preferably 90/10 or less, more preferably 80/20 or less, even more preferably 70/30 or less. If the mass ratio is 10/90 or more, the resultant resin composition has better rebound resilience, bending stiffness, fluidity and flexibility. In addition, if the mass ratio is 90/10 or less, the resultant resin composition has better flexibility.

As (D) the unsaturated aliphatic polycarboxylic acid, a salt of an unsaturated aliphatic polycarboxylic acid may be used. Examples of the cation component of the unsaturated aliphatic polycarboxylic acid salt include a metal ion, an ammonium ion, and an organic cation. Examples of the metal ion include a monovalent metal ion such as sodium, potassium, lithium and silver; a divalent metal ion such as magnesium, calcium, zinc, barium, cadmium, copper, cobalt, nickel and manganese; a trivalent metal ion such as aluminum and iron; and other ion such as tin, zirconium and titanium. The cation component may be used solely, or at least two of them may be used in combination.

[(E) Amphoteric Surfactant]

The golf ball resin composition may further comprise (E) an amphoteric surfactant. It is considered that (E) the amphoteric surfactant is taken into the ion association of the ionomer resin, and finely disperses the ion association to inhibit crystallization of ethylene chains or weakens constraining of main chains by the ion association. With these actions, the mobility of the molecular chain of the golf ball resin composition according to the present invention increases, and thus the resilience of the golf ball resin composition according to the present invention increases while retaining the flexibility.

(E) The amphoteric surfactant is not particularly limited, as long as it has a cationic part and an anionic part within the molecule, and has an action of lowering surface tension when being dissolved in water. Examples of (E) the amphoteric surfactant include a betaine type amphoteric surfactant such as an alkylbetaine type, amidobetaine type, imidazoliumbetaine type, alkylsulfobetain type, amidosulfobetain type, and the like; an amidoamino acid type amphoteric surfactant and an alkylamino fatty acid salt; an alkylamine oxide; a β-alanine type amphoteric surfactant and a glycine type amphoteric surfactant; a sulfobetaine type amphoteric surfactant; a phosphobetaine type amphoteric surfactant; and the like. (E) The amphoteric surfactant may be used solely, or at least two of them may be used in combination.

Specific examples of (E) the amphoteric surfactant include dimethyllaurylbetaine, oleylbetaine, dimethyloleylbetaine, dimethylstearylbetaine, stearyldihydroxymethylbetaine, stearyldihydroxyethylbetaine, lauryldihydroxymethylbetaine, lauryldihydroxyethylbetaine, myristyldihydroxymethylbetaine, behenyldihydroxymethylbetaine, palmityldihydroxyethylbetaine, oleyldihydroxymethylbetaine, coconut oil fatty acid amidopropylbetaine, lauric acid amidoalkylbetaine, 2-alkyl-N-carboxyalkylimidazoliumbetaine, lauric acid amidoalkylhydroxysulfobetaine, coconut oil fatty acid amidodialkylhydroxyalkylsulfobetaine, N-alkyl-β-aminopropionic acid salt, N-alkyl-β-iminodipropionic acid salt, alkyldiaminoalkylglycine, alkylpolyaminoalkylglycine, sodium salt of alkylamino fatty acid, N,N-dimethyloctylamine oxide, N,N-dimethyllaurylamine oxide, N,N-dimethylstearylamine oxide, and the like.

The amount of (E) the amphoteric surfactant is preferably 1 part by mass or more, more preferably 3 parts by mass or more, even more preferably 5 parts by mass or more, and is preferably 20 parts by mass or less, more preferably 15 parts by mass or less, even more preferably 10 parts by mass or less, with respect to 100 parts by mass of (A) the resin component. If the amount of (E) the amphoteric surfactant falls within the above range, the surfactant molecule is easily taken into the ion association of the ionomer resin, thus the mobility of the molecular chain of the ionomer resin increases, and the resilience of the golf ball resin composition increases while retaining the flexibility.

[(F) Metal Compound]

The golf ball resin composition may further comprise (F) a metal compound. (F) The metal compound is employed to neutralize unneutralized carboxyl groups of the golf ball resin composition, and may be added where necessary. Examples of (F) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. These (F) metal compounds may be used solely, or at least two of them may be used in combination.

[Golf Ball Resin Composition]

The golf ball resin composition according to the present invention has a neutralization degree of more than 80 mole %. The neutralization degree is preferably 85 mole % or more, more preferably 90 mole % or more, and is preferably 160 mole % or less, more preferably 150 mole % or less, even more preferably 140 mole % or less. If the neutralization degree is more than 80 mole %, the amount of the ion association increases, and thus the golf ball resin composition has greater resilience. If the neutralization degree is 160 mole % or less, the golf ball resin composition has better fluidity. It is noted that the neutralization degree of the golf ball resin composition is defined by the following formula.

Neutralization degree (mole %)=100×[Σ(mole number of cation component×valence of cation component)]/[Σ(mole number of anion component×valence of anion component)]  [Formula 1]

In the formula, Σ(mole number of cation component× valence of cation component) is a sum of a product obtained by multiplying the mole number of the cation component by the valence of the cation component in the component (A), a product obtained by multiplying the mole number of the cation component by the valence of the cation component in the component (B), a product obtained by multiplying the mole number of the cation component by the valence of the cation component in the component (C), and a product obtained by multiplying the mole number of the cation component by the valence of the cation component in the component (D). It is noted that, when the golf ball resin composition further comprises the component (E) and/or the component (F), Σ(mole number of cation component×valence of cation component) further includes a product obtained by multiplying the mole number of the cation-forming group or cation component by the valence of the cation-forming group or cation component in the component (E) and/or the component (F).

In the formula, Σ(mole number of anion component× valence of anion component) is a sum of the mole number of the carboxyl group in the component (A), the mole number of the carboxyl group in the component (B), the mole number of the carboxyl group in the component (C) and the mole number of the carboxyl group in the component (D). It is noted that, when the golf ball resin composition further comprises the component (E), Σ(mole number of anion component×valence of anion component) further includes a product obtained by multiplying the mole number of the anion-forming group by the valence of the anion-forming group in the component (E).

It is noted that, in the above formula, the cation component, cation-forming group, metal component, carboxyl group and anion-forming group include an unionized precursor. The amount of the cation component, the amount of the cation-forming group and the amount of the anion-forming group may be determined, for example, by a neutralization titration method.

For example, when the golf ball resin composition comprises the component (A), component (B), component (C), component (D), component (E) and component (F), Σ(mole number of cation component×valence of cation component) is a sum of a product obtained by multiplying the mole number of the metal ion by the valence of the metal ion in the component (A), component (B), component (C) and component (D), and a product obtained by multiplying the mole number of the cation-forming group or cation component by the valence of the cation-forming group or cation component in the component (E) and component (F), and Σ(mole number of anion component×valence of anion component) is a sum of the mole number of all the carboxyl groups in the component (A), component (B), component (C) and component (D), and a product obtained by multiplying the mole number of the anion by the valence of the anion in the component (E).

The base resin of the golf ball resin composition according to the present invention preferably consists of (A) the resin component. However, the base resin may further include other thermoplastic elastomer or thermoplastic resin as long as they do not impair the effect of the invention. When the other thermoplastic elastomer or thermoplastic resin is included, the amount of (A) the resin component is preferably 50 mass % or more, more preferably 60 mass % or more, even more preferably 70 mass % or more, with respect to the total amount of the base resin.

Specific examples of the other thermoplastic elastomer mentioned above include a thermoplastic polyamide elastomer having a trade name of "Pebax (e.g. "Pebax 2533")" commercially available from Arkema K. K.; a thermoplastic polyurethane elastomer having a trade name of "Elastollan (e.g. "Elastollan XNY85A")" commercially available from BASF Japan Ltd; a thermoplastic polyester elastomer having a trade name of "Hytrel (e.g. "Hytrel 3548" and "Hytrel 4047")" commercially available from Du Pont-Toray Co., Ltd.; and a thermoplastic styrene elastomer having a trade name of "Rabalon (e.g. "Rabalon T3221C")" commercially available from Mitsubishi Chemical Corporation.

The golf ball resin composition may further comprises a pigment component such as a white pigment (e.g. titanium oxide) and a blue pigment, a weight adjusting agent, a dispersant, an antioxidant, an ultraviolet absorber, a light stabilizer, a fluorescent material or a fluorescent brightener, as long as they do not impair the performance of the golf ball.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component. If the amount of the white pigment is 0.5 part by mass or more, it is possible to impart the opacity to the resultant golf ball constituent member. In addition, if the amount of the white pigment exceeds 10 parts by mass, the durability of the resultant golf ball may deteriorate.

The golf ball resin composition according to the present invention may be obtained by melt blending (A) the resin component, (B) the saturated fatty acid, (C) the unsaturated fatty acid, (D) the unsaturated aliphatic polycarboxylic acid, and where necessary (E) the amphoteric surfactant and other additives. The melt blending may be carried out using a kneader or an extruder (e.g. single-screw extruder, twin-screw extruder, and twin-single screw extruder).

The golf ball resin composition according to the present invention preferably has a melt flow rate (190° C., 2.16 kgf) of 0.01 g/10 min or more, more preferably 0.05 g/10 min or more, even more preferably 0.1 g/10 min or more, particularly preferably 1.0 g/10 min or more, most particularly 3.0 g/10 min or more. In addition, the golf ball resin composition according to the present invention preferably has a melt flow rate (190° C., 2.16 kgf) of 100 g/10 min or less, more preferably 80 g/10 min or less, even more preferably 50 g/10 min or less. If the golf ball resin composition has a melt flow rate falling within the above range, the golf ball resin composition may be easily molded into a golf ball constituent member.

The golf ball resin composition according to the present invention preferably has a hardness of 20 or more, more preferably 25 or more, even more preferably 30 or more in Shore D hardness, and preferably has a hardness of 80 or less, more preferably 77 or less, even more preferably 75 or less in Shore D hardness. If the golf ball resin composition having a hardness of 20 or more in Shore D hardness is used, the golf ball having better resilience (travelling a greater distance) may be obtained. On the other hand, if the golf ball resin composition having a hardness of 80 or less in Shore D hardness is used, the golf ball having better shot feeling may be obtained. Herein, the hardness of the golf ball resin composition is a slab hardness of the golf ball resin composition molded into a sheet form, and is measured by the measurement method described later.

The golf ball resin composition according to the present invention preferably has a bending stiffness of 70 MPa (714 kgf/cm$^2$) or more, more preferably 90 MPa (918 kgf/cm$^2$) or more, even more preferably 100 MPa (1020 kgf/cm$^2$) or more, and preferably has a bending stiffness of 500 MPa (5100 kgf/cm$^2$) or less, more preferably 400 MPa (4080 kgf/cm$^2$) or less, even more preferably 300 MPa (3060 kgf/cm$^2$) or less. If the golf ball resin composition having a bending stiffness of 70 MPa (714 kgf/cm$^2$) or more is used, the golf ball having better resilience (travelling a greater distance) may be obtained. In addition, if the golf ball resin composition having a bending stiffness of 500 MPa (5100 kgf/cm$^2$) or less is used, the resultant golf ball has appropriate flexibility and thus has better shot feeling.

The golf ball resin composition according to the present invention preferably has a rebound resilience of 40% or more, more preferably 45% or more, even more preferably 50% or more, most preferably 60% or more. If the golf ball resin composition having a rebound resilience of 40% or more is used, the golf ball having better resilience (travelling a greater distance) may be obtained.

The bending stiffness and the rebound resilience are a bending stiffness and a rebound resilience of the golf ball resin composition molded into a sheet form, and are measured by the measurement method described later.

The golf ball resin composition according to the present invention preferably has a breaking stress of 6 MPa or more, more preferably 8 MPa or more, even more preferably 9 MPa or more, particularly preferably 10 MPa or more, and preferably has a breaking stress of 50 MPa or less, more preferably 40 MPa or less, even more preferably 30 MPa or less, particularly preferably 25 MPa or less. If the golf ball resin composition has a breaking stress of 6 MPa or more is used, the resultant golf ball has better durability. In addition, if the breaking stress is 50 MPa or less, the resultant golf ball has appropriate flexibility and thus has better shot feeling. Herein, the breaking stress is a tensile stress at the time a test piece is broken, and may be calculated from a load at the time the test piece is broken and an initial cross-sectional area of the test piece.

The golf ball resin composition according to the present invention preferably has a breaking strain of 60% or more, more preferably 80% or more, even more preferably 90% or more, particularly preferably 100% or more, and preferably has a breaking strain of 600% or less, more preferably 550% or less, even more preferably 500% or less, particularly preferably 450% or less. If the golf ball resin composition having a breaking strain of 60% or more is used, the resultant golf ball has better durability. In addition, if the breaking strain is 600% or less, the resultant golf ball has appropriate flexibility and thus has better shot feeling and better resilience (travels a greater distance). Herein, the breaking strain is a tensile strain at the time a test piece is broken, and may be calculated by dividing an increase amount of the gauge line distance by an initial gauge line distance and multiplying the obtained value by 100.

[Golf Ball]

The present invention provides a golf ball comprising a constituent member formed from a golf ball resin composition, wherein the golf ball resin composition comprises (A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, (B) a saturated fatty acid, (C) an unsaturated fatty acid, and (D) an unsaturated aliphatic polycarboxylic acid; comprises (B) the saturated fatty acid, (C) the unsaturated fatty acid and (D) the unsaturated aliphatic polycarboxylic acid in a total amount ranging from 80 parts by mass to 200 parts by mass with respect to 100 parts by mass of (A) the resin component; and has a neutralization degree of more than 80 mole %.

Examples of the golf ball according to the present invention include a three-piece golf ball comprising a core, a single-layered intermediate layer disposed around the core, and a cover disposed around the intermediate layer, and a multi-piece golf ball (including the three-piece golf ball mentioned above) comprising a core, at least one intermediate layer disposed around the core, and a cover disposed around the intermediate layer, in which any one of the constituent members constituting the golf ball may be formed from the above golf ball resin composition. Among them, the golf ball comprising an intermediate layer formed from the golf ball resin composition according to the present invention is preferred.

Next, the golf ball according to the present invention will be explained in detail, with reference to the preferable embodiment which is a golf ball (including a three-piece golf ball) comprising a core, at least one intermediate layer disposed around the core, and a cover disposed around the intermediate layer, wherein at least one of the intermediate layers is formed from the golf ball resin composition according to the present invention. It is noted that the golf ball according to the present invention is not limited to this embodiment.

In the preferable embodiment, the core of the golf ball according to the present invention may be a single-layered core or a multi-layered core.

The core generally has a spherical shape, but a rib may be provided thereon to divide the surface of the spherical core. The core may be formed by using a conventional rubber composition (hereinafter, sometimes simply referred to as "core rubber composition"). For example, the core may be formed by heat pressing a rubber composition containing a base rubber, a crosslinking initiator, a co-crosslinking agent and a filler.

As the base rubber, a natural rubber and/or a synthetic rubber may be used. Examples of the base rubber include a polybutadiene rubber, a natural rubber, a polyisoprene rubber, a styrene polybutadiene rubber, and an ethylene-propylene-diene rubber (EPDM). Among them, particularly preferred is a high cis-polybutadiene having a cis-bond which is beneficial to the resilience in a content of 40 mass % or more, preferably 70 mass % or more, more preferably 90 mass % or more.

The crosslinking initiator is blended to crosslink the base rubber component. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane and di-t-butyl peroxide. Among them, dicumyl peroxide is preferably used. The amount of the crosslinking initiator is preferably 0.3 part by mass or more, more preferably 0.4 part by mass or more, and is preferably 5 parts by mass or less, more preferably 3 parts by mass or less, with respect to 100 parts by mass of the base rubber. If the amount of the crosslinking initiator is less than 0.3 part by mass, the core becomes so soft that the resilience of the golf ball tends to be lowered, and if the amount of the crosslinking initiator is more than 5 parts by mass, the amount of the co-crosslinking agent must be decreased to obtain an appropriate hardness, which tends to cause insufficient resilience.

It is considered that the co-crosslinking agent has an action of crosslinking rubber molecules by graft polymerization to a molecular chain of the base rubber. As the co-crosslinking agent, for example, an α,β-unsaturated carboxylic acid having 3 to 8 carbon atoms or a metal salt thereof may be used. Preferable examples of the co-crosslinking agent include acrylic acid, methacrylic acid and metal salts thereof. Examples of the metal constituting the metal salt include zinc, magnesium, calcium, aluminum and sodium. Among them, the zinc salt is preferably used because it provides high resilience to the golf ball.

The amount of the co-crosslinking agent is preferably 10 parts by mass or more, more preferably 15 parts by mass or more, even more preferably 20 parts by mass or more, and is preferably 55 parts by mass or less, more preferably 50 parts by mass or less, even more preferably 48 parts by mass or less, with respect to 100 parts by mass of the base rubber. If the amount of the co-crosslinking agent is less than 10 parts by mass, the amount of the crosslinking initiator must be increased to obtain an appropriate hardness, which tends to lower the resilience. On the other hand, if the amount of the co-crosslinking agent is more than 55 parts by mass, the core becomes so hard that the shot feeling may be lowered.

The filler blended in the core rubber composition is mainly used as a weight adjusting agent for adjusting the weight of the golf ball obtained as a final product, and may be blended where necessary. Examples of the filler include an inorganic filler such as zinc oxide, barium sulfate, calcium carbonate, magnesium oxide, tungsten powder, molybdenum powder, and the like. The amount of the filler is preferably 0.5 part by mass or more, more preferably 1 part by mass or more, and is preferably 30 parts by mass or less, more preferably 20 parts by mass or less, with respect to 100 parts by mass of the base rubber. If the amount of the filler is less than 0.5 part by mass, it is difficult to adjust the weight, and if the amount of the filler is more than 30 parts by mass, the weight fraction of the rubber component is reduced and thus the resilience tends to be lowered.

In the core rubber composition, an organic sulfur compound, an antioxidant or a peptizing agent may be blended appropriately, in addition to the base rubber, the crosslinking initiator, the co-crosslinking agent and the filler.

Examples of the organic sulfur compound include thiophenols, thionaphthols, polysulfides, thiocarboxylic acids, dithiocarboxylic acids, sulfenamindes, thiurams, dithiocarbamates and thiazoles. Among them, the thionaphthols are preferably used as the organic sulfur compound. Examples of the thionaphthols include 2-thionaphthol, 1-thionaphthol, 2-chloro-1-thionaphthol, 2-bromo-1-thionaphthol, 2-fluoro-1-thionaphthol, 2-cyano-1-thionaphthol, 2-acetyl-1-thionaphthol, 1-chloro-2-thionaphthol, 1-bromo-2-thionaphthol, 1-fluoro-2-thionaphthol, 1-cyano-2-thionaphthol, 1-acetyl-2-thionaphthol and metal salts thereof. These thionaphthols can enhance the resilience of the core by having some influence on the vulcanization state of the vulcanized rubber. Among them, 1-thionaphthol, 2-thionaphthol and zinc salts thereof are particularly preferred since the golf ball having a high resilience may be easily obtained. The amount of the organic sulfur compound is preferably 0.1 part by mass or more, more preferably 0.3 parts by mass or more, and is preferably 5.0 parts by mass or less, more preferably 3.0 parts by mass or less, with respect to 100 parts by mass of the base rubber.

The amount of the antioxidant is preferably 0.1 part by mass or more and 1 part by mass or less with respect to 100 parts by mass of the base rubber. In addition, the amount of the peptizing agent is preferably 0.1 part by mass or more and 5 parts by mass or less with respect to 100 parts by mass of the base rubber.

The core may be obtained by mixing and kneading the above mentioned core rubber composition, and molding the resultant core rubber composition in a mold. The conditions for molding the core rubber composition are not particularly limited, but molding is generally carried out at 130° C. to 200° C. under a pressure ranging from 2.9 MPa to 11.8 MPa for 10 to 60 minutes. For example, it is preferred that the core rubber composition is heated at 130° C. to 200° C. for 10 to 60 minutes, or alternatively the core rubber composition is subjected to a two-step heating, i.e. the core rubber composition is heated at 130° C. to 150° C. for 20 to 40 minutes and then heated at 160° C. to 180° C. for 5 to 15 minutes.

The core preferably has a diameter of 34.8 mm or more, more preferably 35.0 mm or more, even more preferably 35.2 mm or more, and preferably has a diameter of 41.2 mm or less, more preferably 41.0 mm or less, even more preferably 40.8 mm or less. If the core has a diameter of 34.8 mm or more, the thickness of the intermediate layer or the cover does not become too thick and thus the resilience becomes better. On the other hand, if the core has a diameter of 41.2 mm or less, the thickness of the intermediate layer or the cover does not become too thin and thus the intermediate layer or the cover functions better.

When the core has a diameter ranging from 34.8 mm to 41.2 mm, the compression deformation amount of the core (shrinking amount of the core along the compression direction) when applying a load from 98 N as an initial load to 1275 N as a final load to the core is preferably 1.90 mm or more, more preferably 2.00 mm or more, even more preferably 2.10 mm or more, and is preferably 4.00 mm or less, more preferably 3.90 mm or less, even more preferably 3.80 mm or less. If the compression deformation amount is 1.90 mm or more, the shot feeling of the golf ball becomes better, and if the compression deformation amount is 4.00 mm or less, the resilience of the golf ball becomes better.

The core preferably has a center hardness of 30 or more, more preferably 32 or more, even more preferably 35 or more in Shore D hardness. If the center hardness of the core is less than 30 in Shore D hardness, the core becomes so soft that the resilience thereof may be lowered. In addition, the core preferably has a center hardness of 70 or less, more preferably 65 or less, even more preferably 60 or less in Shore D hardness. If the center hardness of the core exceeds 70 in Shore D hardness, the core becomes so hard that the shot feeling thereof tends to be lowered. In the present invention, the center hardness of the core is a hardness measured with a Shore D type spring hardness tester at the central point of a cut plane which is obtained by equally cutting the core into two hemispheres.

The core preferably has a surface hardness of 45 or more, more preferably 50 or more, even more preferably 55 or more in Shore D hardness. In addition, the core preferably has a surface hardness of 85 or less, more preferably 80 or less, even more preferably 78 or less in Shore D hardness. If the surface hardness of the core is 45 or more in Shore D hardness, the core does not become excessively soft and thus the resilience thereof becomes better. In addition, if the surface hardness of the core is 85 or less in Shore D hardness, the core does not become excessively hard and thus the shot feeling thereof becomes better.

Examples of the method for forming the intermediate layer include a method of covering the core with the golf ball resin composition according to the present invention (hereinafter, sometimes simply referred to as "intermediate layer composition") to form the intermediate layer. The method for molding the intermediate layer is not particularly limited, and includes a method which comprises molding the golf ball resin composition into a hemispherical half shell beforehand, covering the core with two of the half shells and performing compression molding at 130° C. to 170° C. for 1 minute to 5 minutes; and a method which comprises injection molding the golf ball resin composition directly onto the core to cover the core. The intermediate layer of the golf ball according to the present invention is preferably formed by the injection molding method. If the injection molding method is employed, the molding of the intermediate layer becomes easier.

In the case of injection molding the intermediate layer composition onto the core to form the intermediate layer, it is preferred to use upper and lower molds, each having a hemispherical cavity and pimples wherein a part of the pimple also serves as a retractable hold pin. When molding the intermediate layer by the injection molding method, the hold pin is protruded to hold the core, and the intermediate layer composition which has been heated and melted is charged and then cooled to form the intermediate layer.

When molding the intermediate layer by the compression molding method, the molding of the half shell may be performed by either a compression molding method or an injection molding method, and the compression molding method is preferred. Compression molding the intermediate layer composition into the half shell may be carried out, for example, under a pressure of 1 MPa or more and 20 MPa or less at a temperature of −20° C. or more and +70° C. or less relative to the flow beginning temperature of the intermediate layer composition. If the molding is carried out under the above conditions, the half shell having a uniform thickness can be formed. Examples of the method for molding the intermediate layer by using the half shell include a method of covering the core with two of the half shells and performing compression molding. Compression molding the half shells into the intermediate layer may be carried out, for example, under a pressure of 0.5 MPa or more and 25 MPa or less at a temperature of −20° C. or more and +70° C. or less relative to the flow beginning temperature of the intermediate layer composition. If the molding is carried out under the above conditions, the intermediate layer having a uniform thickness can be formed.

It is noted that the molding temperature means the highest temperature where the temperature at the surface of the concave portion of the lower mold reaches from closing the mold to opening the mold. In addition, the flow beginning temperature of the intermediate layer composition may be measured using the intermediate layer composition in a pellet form under the following conditions with "Flow Tester CFT-500" commercially available from Shimadzu Corporation.

Measuring conditions: Plunger area: 1 $cm^2$, Die length: 1 mm, Die diameter: 1 mm, Load: 588.399 N, Starting temperature: 30° C., and Temperature increase rate: 3° C./min.

The intermediate layer preferably has a thickness of 0.5 mm or more, more preferably 0.6 mm or more, even more preferably 0.7 mm or more. If the thickness of the intermediate layer is 0.5 mm or more, the molding of the intermediate layer becomes easier and the obtained golf ball has enhanced durability. The intermediate layer preferably has a thickness of 15 mm or less, more preferably 14 mm or less, even more preferably 13 mm or less. If the thickness of the intermediate layer is 15 mm or less, the obtained golf ball has better resilience and shot feeling.

In the preferable embodiment, in the case that the golf ball according to the present invention comprises at least two intermediate layers, at least one of the intermediate layers may be formed from the golf ball resin composition according to the present invention, and an intermediate layer formed from an intermediate layer composition other than the golf ball resin composition according to the present invention may be comprised as long as this does not impair the effect of the present invention. In this case, the outermost intermediate layer is preferably formed from the golf ball resin composition according to the present invention. In addition, it is also preferred that all the intermediate layers are formed from the golf ball resin composition according to the present invention.

Examples of the intermediate layer composition other than the golf ball resin composition according to the present invention include the above mentioned core rubber composition and ionomer resin; a thermoplastic polyamide elastomer having a trade name of "Pebax (registered trademark) (e.g. "Pebax 2533")" commercially available from Arkema K. K.; a thermoplastic polyester elastomer having a trade name of "Hytrel (registered trademark) (e.g. "Hytrel 3548" and "Hytrel 4047")" commercially available from Du Pont-Toray Co., Ltd.; a thermoplastic polyurethane elastomer having a trade name of "Elastollan (registered trademark) (e.g. "Elastollan XNY97A")" commercially available from BASF Japan Ltd; and a thermoplastic styrene elastomer having a trade name of "Rabalon (registered trademark)" commercially available from Mitsubishi Chemical Corporation. In addition, the intermediate layer composition may further contain a weight adjusting agent such as barium sulfate and tungsten, an antioxidant, a pigment, and the like.

In the preferable embodiment, the cover of the golf ball according to the present invention is formed from a cover composition containing a resin component. Examples of the resin component include an ionomer resin; a thermoplastic polyurethane elastomer having a trade name of "Elastollan (registered trademark) (e.g. "Elastollan XNY97A")" commercially available from BASF Japan Ltd; a thermoplastic polyamide elastomer having a trade name of "Pebax (registered trademark) (e.g. "Pebax 2533")" commercially available from Arkema K. K.; a thermoplastic polyester elastomer having a trade name of "Hytrel (registered trademark) (e.g. "Hytrel 3548" and "Hytrel 4047")" commercially available from Du Pont-Toray Co., Ltd.; and a thermoplastic styrene elastomer having a trade name of "Rabalon (registered trademark)" commercially available from Mitsubishi Chemical Corporation. In addition, a binary copolymer composed of an olefin and an $\alpha,\beta$-unsaturated carboxylic acid having 3 to 8 carbon atoms and/or a ternary copolymer composed of an olefin, an $\alpha,\beta$-unsaturated carboxylic acid having 3 to 8 carbon atoms and an $\alpha,\beta$-unsaturated carboxylic acid ester, which are (A) the resin component, may also be used. These resin components may be used solely, or at least two of them may be used in combination.

In the preferable embodiment, the cover composition for forming the cover of the golf ball preferably contains the thermoplastic polyurethane elastomer or the ionomer resin as the resin component. The amount of the thermoplastic polyurethane elastomer or the ionomer resin in the resin component of the cover composition is preferably 50 mass % or more, more preferably 60 mass % or more, even more preferably 70 mass % or more.

In addition to the above mentioned resin component, the cover composition may further contain a pigment component such as a white pigment (e.g. titanium oxide), a blue pigment and a red pigment, a weight adjusting agent such as zinc oxide, calcium carbonate and barium sulfate, a dispersant, an antioxidant, an ultraviolet absorber, a light stabilizer, a fluorescent material or a fluorescent brightener, and the like, as long as they do not impair the performance of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the cover. In addition, if the amount of the white pigment is more than 10 parts by mass, the durability of the resultant cover may deteriorate.

The cover composition preferably has a slab hardness of 70 or less, more preferably 68 or less, even more preferably 65 or less in Shore D hardness. If the slab hardness of the cover composition is 70 or less, the spin rate on approach shots with a short iron or the like becomes greater. As a result, the golf ball having excellent controllability on approach shots may be obtained. In addition, in order to sufficiently ensure the spin rate on approach shots, the cover composition preferably has a slab hardness of 20 or more, more preferably 25 or more, even more preferably 30 or more in Shore D hardness.

Examples of the method for molding the cover of the golf ball according to the present invention include a method which comprises molding the cover composition into a hollow shell, covering the intermediate layer with a plurality of the hollow shells and performing compression molding (preferably a method which comprises molding the cover composition into a hollow half-shell, covering the intermediate layer with two of the half-shells and performing compression molding); and a method which comprises injection molding the cover composition directly onto the intermediate layer.

When molding the cover by the compression molding method, the molding of the half shell may be performed by either a compression molding method or an injection molding method, and the compression molding method is preferred. Compression molding the cover composition into the half shell may be carried out, for example, under a pressure of 1 MPa or more and 20 MPa or less at a temperature of −20° C. or more and +70° C. or less relative to the flow beginning temperature of the cover composition. If the molding is carried out under the above conditions, the half shell having a uniform thickness can be formed. Examples of the method for molding the cover by using the half shell include a method of covering the spherical body having the intermediate layer formed thereon, with two of the half shells, and performing compression molding. Compression molding the half shells into the cover may be carried out, for example, under a pressure of 0.5 MPa or more and 25 MPa or less at a temperature of −20° C. or more and +70° C. or less relative to the flow beginning temperature of the cover composition. If the molding is carried out under the above conditions, the cover having a uniform thickness can be formed.

In the case of injection molding the cover composition into the cover, the cover composition extruded into a pellet form may be subjected to the injection molding, or the dry blended cover materials such as the base resin component, the pigment and the like may be directly subjected to the injection molding. When molding the cover, it is preferred to use upper and lower molds, each having a hemispherical cavity and pimples wherein a part of the pimple also serves as a retractable hold pin. When molding the cover by the injection molding method, the hold pin is protruded to hold the spherical body having the intermediate layer formed thereon, and the cover composition is charged and then cooled to form the cover. For example, the cover may be molded by charging the cover composition heated to 200° C.

to 250° C. into a mold held under a pressure of 9 MPa to 15 MPa for 0.5 to 5 seconds, and opening the mold after cooling for 10 to 60 seconds.

The concave portions called "dimple" are usually formed on the surface of the cover. The total number of the dimples formed on the cover is preferably 200 or more and 500 or less. If the total number of the dimples is less than 200, the dimple effect is hardly obtained. On the other hand, if the total number of the dimples exceeds 500, the dimple effect is hardly obtained because the size of the respective dimple is small. The shape (shape in a plan view) of the dimples formed on the cover includes, without limitation, a circle; a polygonal shape such as a roughly triangular shape, a roughly quadrangular shape, a roughly pentagonal shape and a roughly hexagonal shape; and other irregular shape. These shapes may be employed solely, or at least two of them may be employed in combination.

The cover preferably has a thickness of 2.0 mm or less, more preferably 1.6 mm or less, even more preferably 1.2 mm or less, particularly preferably 1.0 mm or less. If the thickness of the cover is 2.0 mm or less, the resultant golf ball has better resilience and shot feeling. The cover preferably has a thickness of 0.1 mm or more, more preferably 0.2 mm or more, even more preferably 0.3 mm or more. If the thickness of the cover is less than 0.1 mm, it may become difficult to mold the cover. In addition, the durability and wear resistance of the cover may deteriorate.

The golf ball body having the cover formed thereon is ejected from the mold, and is preferably subjected to surface treatments such as deburring, cleaning and sandblast where necessary. In addition, if desired, a paint film or a mark may be formed. The paint film preferably has a thickness of, but not limited to, 5 µm or more, more preferably 7 µm or more, and preferably has a thickness of 50 µm or less, more preferably 40 µm or less, even more preferably 30 µm or less. If the thickness of the paint film is less than 5 µm, the paint film is easy to wear off due to the continued use of the golf ball, and if the thickness of the paint film exceeds 50 µm, the dimple effect is reduced and thus the flight performance of the golf ball may be lowered.

The golf ball according to the present invention preferably has a diameter ranging from 40 mm to 45 mm. In light of satisfying the regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball according to the present invention preferably has a mass of 40 g or more and 50 g or less. In light of obtaining greater inertia, the mass is more preferably 44 g or more, particularly preferably 45.00 g or more. In light of satisfying the regulation of USGA, the mass is particularly preferably 45.93 g or less.

When the golf ball according to the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus the shot feeling thereof becomes better. On the other hand, if the compression deformation amount is 4.0 mm or less, the resilience of the golf ball becomes greater.

FIG. 1 is a partially cutaway view of a golf ball 1 of one embodiment according to the present invention. The golf ball 1 comprises a spherical core 2, an intermediate layer 3 covering the spherical core 2, and a cover 4 covering the intermediate layer 3. A plurality of dimples 41 are formed on the surface of the cover 4. Other portions than the dimples 41 on the surface of the golf ball are land 42. The intermediate layer 3 is formed from the golf ball resin composition mentioned above.

The embodiment using the golf ball resin composition according to the present invention for an intermediate layer has been explained above. However, the golf ball resin composition according to the present invention may also be used as a cover composition.

EXAMPLES

Next, the present invention will be described in detail by way of examples. However, the present invention is not limited to the examples described below. Various changes and modifications without departing from the spirit of the present invention are included in the scope of the present invention.

[Evaluation Method]
(1) Compression Deformation Amount (mm)

The deformation amount of the core or the golf ball along the compression direction (shrinking amount of the core or the golf ball along the compression direction), when applying a load from 98 N as an initial load to 1275 N as a final load to the core or the golf ball, was measured.

(2) Core Hardness (Shore D Hardness)

The hardness measured at the surface of the core was adopted as the surface hardness of the core. In addition, the hardness measured at the central point of a cut plane which was obtained by cutting the core into two hemispheres was adopted as the center hardness of the core. The hardness was measured with an automatic hardness tester (Digitest II, commercially available from Bareiss company) using a testing device of "Shore D".

(3) Slab Hardness (Shore D Hardness)

Sheets with a thickness of about 2 mm were produced by injection molding the resin composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, commercially available from Bareiss company) using a testing device of "Shore D".

(4) Bending Stiffness (kgf/cm$^2$)

Test pieces with a thickness of about 2 mm, a width of 20 mm and a length of 100 mm were produced by heat press molding the intermediate layer resin composition at 190° C. for 10 minutes. The test pieces were stored at a temperature of 23° C. plus or minus 2° C. and a relative humidity of 50% plus or minus 5% for 14 days. Load scales of the obtained test piece at bending angles of 3°, 6°, 9° and 12° were measured with Olsen stiffness tester (commercially available from Toyo Seiki Seisaku-sho, Ltd.), the bending angles (°) were plotted in the horizontal axis and the load scale readings were plotted in the vertical axis to obtain a linear approximation curve, and the slope of the linear approximation curve was calculated. Measurement was carried out at a temperature of 23° C. plus or minus 2° C., relative humidity of 50% plus or minus 5%, bending speed of 60°/min, and distance between fulcrums of 50 mm. The bending stiffness was calculated by multiplying the slope value obtained above by 8.7078 and then dividing the obtained product by the cube of thickness (cm) of the test piece.

(5) Rebound Resilience (%)

The rebound resilience test was carried out according to JIS K6255 (2013). Sheets with a thickness of about 2 mm were produced by heat press molding the intermediate layer resin composition at 170° C. for 10 minutes. A cylindrical test piece with a thickness of about 12 mm and a diameter of 28 mm was produced by punching the sheet obtained above into a circular shape with a diameter of 28 mm, and stacking six of the obtained circular sheets. The test piece was stored at a temperature of 23° C. plus or minus 2° C. and a relative humidity of 50% plus or minus 5% for 12 hours. The rebound resilience of the obtained test piece was measured with a Lupke type rebound resilience tester (commercially available from Ueshima Seisakusho Co., Ltd.). The planar part of the stacked test piece obtained above was held by a mechanical fixing method during the measurement, and the measurement was carried out at a temperature of 23° C., relative humidity of 50%, impact end diameter of 12.50 mm plus or minus 0.05 mm, impact mass of 0.35 kg plus or minus 0.01 kg and impact speed of 1.4 m/s plus or minus 0.01 m/s.

(6) Tensile Test

Dumbbell shaped test pieces with a thickness of about 2 mm (dumbbell shaped tensile test piece No. 4 prescribed in JIS K 6251: 2004 with an overall length of 100 mm, a width of 15 mm between both ends, a length of 20 mm at a parallel part, a width of 5 mm at a parallel part, a radius of 40 mm at shoulder part and a gauge line distance of 20 mm) were produced by heat press molding the intermediate layer resin composition at 170° C. for 10 minutes. The test pieces were stored at a temperature of 23° C. plus or minus 1° C. and a relative humidity of 50% plus or minus 5% for 12 hours. The tensile test was conducted using a tensile compression tester (commercially available from Shimadzu Corporation) to measure the breaking stress (tensile stress at the time the test piece was broken) and breaking strain (tensile strain corresponding to the breaking stress) of the obtained test pieces. The measurement was conducted under the conditions of a temperature of 23° C. plus or minus 1° C., a relative humidity of 50% plus or minus 5% and a tensile speed of 500 mm/min.

(7) Coefficient of Restitution

A metal cylindrical object with a mass of 198.4 g was allowed to collide with each golf ball at a speed of 40 m/sec, and the speeds of the cylindrical object and the golf ball before and after the collision were measured. Based on these speeds and the mass of each object, coefficient of restitution for each golf ball was calculated. It is noted that the measurement was conducted using twelve samples for each golf ball, and the average value thereof was adopted as the coefficient of restitution of the golf ball.

(8) Flight Distance

A W #1 driver provided with a metal head (XXIO S, loft angle: 11°, commercially available from Dunlop Sports Limited) was installed on a swing robot M/C commercially available from Golf Laboratories, Inc. The golf ball was hit at a head speed of 40 m/sec, and the flight distance (the distance from the launch point to the stop point) thereof was measured. It is noted that the measurement was conducted twelve times for each golf ball, and the average value thereof was adopted as the measurement value of the golf ball. In addition, the difference between the flight distance of each golf ball and the flight distance of the golf ball No. 13 (i.e. flight distance difference=flight distance of each golf ball−flight distance of golf ball No. 13) was calculated, and the flight distance was evaluated based on the following standard.

E (excellent): Flight distance difference is at least 3.0 yards.

G (good): Flight distance difference is at least 0 yard and less than 3.0 yards.

P (poor): Flight distance difference is less than 0 yard.

(9) Durability

A W #1 driver provided with a metal head XXIO S, loft angle: 11°, commercially available from Dunlop Sports Limited) was installed on a swing robot M/C commercially available from Golf Laboratories, Inc. The golf ball was hit repeatedly at a head speed of 45 m/sec until a crack occurred, and the hitting number when the crack occurred was counted. It is noted that the measurement was conducted using twelve samples for each golf ball, and the average value thereof was adopted as the hitting number of the golf ball. The hitting number of the golf ball No. 13 was defined as 100, and the durability of each golf ball was represented by converting the hitting number of each golf ball into this index.

(10) Shot Feeling

An actual hitting test was carried out by ten amateur golfers (high skilled person) using a driver. Feeling at the shot was evaluated by each person based on the following standard. Major result of the evaluations of ten golfers was employed as the shot feeling of the golf ball.

E (excellent): Impact is small and feeling is good.

G (good): Normal feeling.

P (poor): Impact is large and feeling is poor.

[Production of Golf Ball]

(1) Production of Core

The core rubber composition having the formulation shown in Table 1 was kneaded and heat pressed in upper and lower molds, each having a hemispherical cavity, at 170° C. for 20 minutes to obtain spherical cores. It is noted that barium sulfate was appropriately added such that the obtained golf balls have a mass of 45.4 g.

TABLE 1

| Core rubber composition | Formulation (parts by mass) |
| --- | --- |
| Polybutadiene rubber | 100 |
| Zinc acrylate | 30 |
| Dicumyl peroxide | 0.5 |
| 2-Thionaphthol | 0.2 |
| Barium sulfate | Appropriate amount |
| Core diameter (mm) | 39.1 |
| Core compression deformation amount (mm) | 3.86 |
| Core center hardness (Shore D) | 59.4 |
| Core surface hardness (Shore D) | 76.0 |

Polybutadiene rubber: "BR730 (high cis-bond polybutadiene)" (cis-bond content: 95 mass %) commercially available from JSR Corporation Zinc acrylate: commercially available from Sigma-Aldrich Co. LLC.

Barium sulfate: "Barium Sulfate BD" commercially available from Sakai Chemical Industry Co., Ltd.

Dicumyl peroxide: commercially available from Tokyo Chemical Industry Co., Ltd.

2-Thionaphthol: commercially available from Tokyo Chemical Industry Co., Ltd.

(2) Preparation of Cover Composition and Intermediate Layer Composition

The intermediate layer compositions and the cover compositions in a pellet form were prepared respectively, by mixing the blending materials shown in Tables 2 to 5 with a twin-screw kneading extruder.

TABLE 2

| | | | Golf ball No. | 1 | 2 | 3 | 4 | 5 | 6 |
|---|---|---|---|---|---|---|---|---|---|
| Intermediate layer composition | Formulation (parts by mass) | (A) | Binary copolymer 1 | 100 | 100 | 100 | 100 | 100 | — |
| | | | Binary copolymer 2 | — | — | — | — | — | 100 |
| | | | Binary copolymer 3 | — | — | — | — | — | — |
| | | | Binary copolymer 4 | — | — | — | — | — | — |
| | | | Ternary copolymer 1 | — | — | — | — | — | — |
| | | (B) | Behenic acid | 30 | 30 | 30 | 30 | 30 | 30 |
| | | (C) | Oleic acid | 90 | 90 | 70 | 90 | 70 | 90 |
| | | (D') | Tsunodyme 395 | 10 | — | 30 | — | — | 10 |
| | | | Haridimer 250 | — | 10 | — | — | — | — |
| | | | Tsunodyme 346 | — | — | — | 10 | 30 | — |
| | | (E) | Oleylbetaine | 5 | 5 | 5 | 5 | 5 | 5 |
| | | (F) | Magnesium hydroxide | 21.5 | 21.5 | 21.5 | 21.5 | 21.5 | — |
| | | | Sodium hydroxide | — | — | — | — | — | 32.5 |
| | | | (B) + (C) + (D) | 130 | 130 | 130 | 130 | 130 | 130 |
| | | | (B)/{(C) + (D)} | 23/77 | 23/77 | 23/77 | 23/77 | 23/77 | 23/77 |
| | Properties | | Neutralization degree (mole %) | 120 | 120 | 120 | 120 | 120 | 120 |
| | | | Slab hardness (Shore D) | 54 | 53 | 56 | 55 | 57 | 56 |
| | | | Bending stiffness (kgf/cm$^2$) | 1131 | 1082 | 1226 | 1162 | 1395 | 1224 |
| | | | Melt flow rate (g/10 min) | 3.6 | 3.4 | 3.4 | 3.2 | 2.8 | 1.0 |
| | | | Rebound resilience (%) | 75 | 75 | 73 | 73 | 72 | 72 |
| | | | Breaking stress (MPa) | 15.0 | 15.3 | 18.2 | 14.5 | 16.1 | 16.8 |
| | | | Breaking strain (%) | 213 | 198 | 153 | 176 | 184 | 169 |
| Golf ball properties | | | Thickness of intermediate layer (mm) | 1.0 | 1.0 | 1.0 | 1.0 | 1.0 | 1.0 |
| | | | Thickness of cover (mm) | 0.8 | 0.8 | 0.8 | 0.8 | 0.8 | 0.8 |
| | | | Compression deformation amount (mm) | 3.29 | 3.36 | 3.17 | 3.23 | 3.13 | 3.17 |
| | | | Coefficient of restitution | 0.777 | 0.775 | 0.775 | 0.773 | 0.776 | 0.772 |
| | | | Flight distance | E | E | E | E | E | E |
| | | | Durability | 165 | 160 | 155 | 160 | 145 | 155 |
| | | | Shot feeling | E | E | E | E | E | E |

| | | | Golf ball No. | 7 | 8 | 9 | 10 | 11 |
|---|---|---|---|---|---|---|---|---|
| Intermediate layer composition | Formulation (parts by mass) | (A) | Binary copolymer 1 | — | — | — | 100 | 100 |
| | | | Binary copolymer 2 | — | — | — | — | — |
| | | | Binary copolymer 3 | 100 | — | — | — | — |
| | | | Binary copolymer 4 | — | 100 | — | — | — |
| | | | Ternary copolymer 1 | — | — | 100 | — | — |
| | | (B) | Behenic acid | 30 | 50 | 30 | 30 | 30 |
| | | (C) | Oleic acid | 90 | 40 | 90 | 90 | 90 |
| | | (D') | Tsunodyme 395 | — | 10 | — | 10 | 10 |
| | | | Haridimer 250 | — | — | — | — | — |
| | | | Tsunodyme 346 | 10 | — | 10 | — | — |
| | | (E) | Oleylbetaine | 5 | — | 5 | 5 | 5 |
| | | (F) | Magnesium hydroxide | — | — | 18.7 | 15.2 | 27.2 |
| | | | Sodium hydroxide | 27.5 | 20.9 | — | — | — |
| | | | (B) + (C) + (D) | 130 | 100 | 130 | 130 | 130 |
| | | | (B)/{(C) + (D)} | 23/77 | 50/50 | 23/77 | 23/77 | 23/77 |
| | Properties | | Neutralization degree (mole %) | 120 | 120 | 120 | 85 | 150 |
| | | | Slab hardness (Shore D) | 57 | 56 | 54 | 54 | 60 |
| | | | Bending stiffness (kgf/cm$^2$) | 1317 | 1946 | 1284 | 1021 | 1453 |
| | | | Melt flow rate (g/10 min) | 2.7 | 2.4 | 2.9 | 6.4 | 2.1 |
| | | | Rebound resilience (%) | 71 | 65 | 70 | 68 | 69 |
| | | | Breaking stress (MPa) | 15.2 | 10.2 | 15.5 | 12.5 | 15.5 |
| | | | Breaking strain (%) | 134 | 171 | 168 | 146 | 139 |
| Golf ball properties | | | Thickness of intermediate layer (mm) | 1.0 | 1.0 | 1.0 | 1.0 | 1.0 |
| | | | Thickness of cover (mm) | 0.8 | 0.8 | 0.8 | 0.8 | 0.8 |
| | | | Compression deformation amount (mm) | 3.13 | 3.18 | 3.30 | 3.31 | 2.98 |
| | | | Coefficient of restitution | 0.772 | 0.767 | 0.771 | 0.758 | 0.773 |
| | | | Flight distance | E | G | E | G | E |
| | | | Durability | 125 | 115 | 130 | 120 | 130 |
| | | | Shot feeling | E | E | E | E | G |

(D') includes (D) an unsaturated aliphatic polycarboxylic acid and (C) an unsaturated fatty acid.

TABLE 3

| | | | Golf ball No. | 12 | 13 | 14 | 15 | 16 |
|---|---|---|---|---|---|---|---|---|
| Intermediate layer composition | Formulation (parts by mass) | (A) | Binary copolymer 1 | 100 | 100 | 100 | 50 | — |
| | | | Binary copolymer 2 | — | — | — | 50 | 100 |
| | | | Binary copolymer 3 | — | — | — | — | — |
| | | | Binary copolymer 4 | — | — | — | — | — |
| | | | Ternary copolymer 1 | — | — | — | — | — |
| | | (B) | Behenic acid | 30 | 68 | — | — | 30 |

TABLE 3-continued

| | | | | | | | | |
|---|---|---|---|---|---|---|---|---|
| | (C) | Oleic acid | 100 | — | 90 | 110 | — |
| | (D') | Tsunodyme 395 | — | — | — | — | — |
| | | Haridimer 250 | — | — | — | — | — |
| | | Tsunodyme 346 | — | — | — | — | — |
| | (E) | Oleylbetaine | 5 | — | 5 | 5 | 20 |
| | (F) | Magnesium hydroxide | 21.5 | 13.1 | 17.3 | 20.6 | 11.5 |
| | | Sodium hydroxide | — | — | — | — | — |
| | | (B) + (C) + (D) | 130 | 68 | 90 | 110 | 30 |
| | | (B)/{(C) + (D)} | 23/77 | — | — | — | — |
| Properties | | Neutralization degree (mole %) | 120 | 120 | 120 | 120 | 120 |
| | | Slab hardness (Shore D) | 55 | 61 | 54 | 57 | 60 |
| | | Bending stiffness (kgf/cm$^2$) | 1162 | 2295 | 715 | 1130 | 1254 |
| | | Melt flow rate (g/10 min) | 3.9 | 1.2 | 3.2 | 2.6 | failed to be measured |
| | | Rebound resilience (%) | 74 | 61 | 73 | 74 | 62 |
| | | Breaking stress (MPa) | 13.5 | 20.6 | 15.4 | 13.2 | 26.7 |
| | | Breaking strain (%) | 114 | 63 | 64 | 35 | 74 |
| Golf ball properties | | Thickness of intermediate layer (mm) | 1.0 | 1.0 | 1.0 | 1.0 | 1.0 |
| | | Thickness of cover (mm) | 0.8 | 0.8 | 0.8 | 0.8 | 0.8 |
| | | Compression deformation amount (mm) | 3.17 | 2.94 | 3.31 | 3.14 | 2.98 |
| | | Coefficient of restitution | 0.776 | 0.761 | 0.759 | 0.775 | 0.751 |
| | | Flight distance | E | G | G | E | G |
| | | Durability | 100 | 100 | 85 | 65 | 120 |
| | | Shot feeling | E | G | E | E | G |

| | | | Golf ball No. | 17 | 18 | 19 | 20 | 21 |
|---|---|---|---|---|---|---|---|---|
| Intermediate layer composition | Formulation (parts by mass) | (A) | Binary copolymer 1 | — | — | — | — | — |
| | | | Binary copolymer 2 | 100 | 100 | 100 | 100 | — |
| | | | Binary copolymer 3 | — | — | — | — | 100 |
| | | | Binary copolymer 4 | — | — | — | — | — |
| | | | Ternary copolymer 1 | — | — | — | — | — |
| | | (B) | Behenic acid | 30 | 50 | — | — | 68 |
| | | (C) | Oleic acid | — | — | 80 | 130 | — |
| | | (D') | Tsunodyme 395 | — | — | — | — | — |
| | | | Haridimer 250 | — | — | — | — | — |
| | | | Tsunodyme 346 | — | — | — | — | — |
| | | (E) | Oleylbetaine | 30 | 20 | 5 | 5 | — |
| | | (F) | Magnesium hydroxide | 11.7 | 13.5 | 18.1 | 24.3 | 11.4 |
| | | | Sodium hydroxide | — | — | — | — | — |
| | | | (B) + (C) + (D) | 30 | 50 | 80 | 130 | 68 |
| | | | (B)/{(C) + (D)} | — | — | — | — | — |
| | Properties | | Neutralization degree (mole %) | 120 | 120 | 120 | 120 | 120 |
| | | | Slab hardness (Shore D) | 55 | 58 | 60 | 59 | 59 |
| | | | Bending stiffness (kgf/cm$^2$) | 1029 | 1507 | 945 | 963 | 2230 |
| | | | Melt flow rate (g/10 min) | 0.2 | 0.4 | 0.7 | 0.6 | 1.3 |
| | | | Rebound resilience (%) | 65 | 64 | 70 | 71 | 58 |
| | | | Breaking stress (MPa) | 20.1 | 25.6 | 19.4 | 13.8 | 16.4 |
| | | | Breaking strain (%) | 42 | 104 | 79 | 100 | 95 |
| Golf ball properties | | | Thickness of intermediate layer (mm) | 1.0 | 1.0 | 1.0 | 1.0 | 1.0 |
| | | | Thickness of cover (mm) | 0.8 | 0.8 | 0.8 | 0.8 | 0.8 |
| | | | Compression deformation amount (mm) | 3.26 | 3.10 | 2.96 | 2.97 | 3.03 |
| | | | Coefficient of restitution | 0.752 | 0.757 | 0.760 | 0.763 | 0.754 |
| | | | Flight distance | G | G | G | G | G |
| | | | Durability | 80 | 145 | 100 | 95 | 105 |
| | | | Shot feeling | E | E | G | G | E |

(D') includes (D) an unsaturated aliphatic polycarboxylic acid and (C) an unsaturated fatty acid.

TABLE 4

| | | | Golf ball No. | 22 | 23 | 24 | 25 | 26 | 27 |
|---|---|---|---|---|---|---|---|---|---|
| Intermediate layer composition | Formulation (parts by mass) | (A) | Binary copolymer 1 | — | — | — | — | — | — |
| | | | Binary copolymer 2 | — | — | — | — | — | — |
| | | | Binary copolymer 3 | — | — | — | — | — | — |
| | | | Binary copolymer 4 | 100 | 100 | 100 | 100 | — | — |
| | | | Ternary copolymer 1 | — | — | — | — | 100 | 100 |
| | | (B) | Behenic acid | 30 | 68 | 100 | 130 | — | 68 |
| | | (C) | Oleic acid | — | — | — | — | — | — |
| | | (D') | Tsunodyme 395 | — | — | — | — | — | — |
| | | | Haridimer 250 | — | — | — | — | — | — |
| | | | Tsunodyme 346 | — | — | — | — | — | — |

TABLE 4-continued

| | | | | | | | | | |
|---|---|---|---|---|---|---|---|---|---|
| | (E) | Oleylbetaine | — | — | — | — | — | — |
| | (F) | Magnesium hydroxide | 6.7 | 10.6 | 13.9 | 17.0 | 3.3 | 3.4 |
| | | Sodium hydroxide | — | — | — | — | — | — |
| | | (B) + (C) + (D) | 30 | 68 | 100 | 130 | 0 | 68 |
| | | (B)/{(C) + (D)} | — | — | — | — | — | — |
| Properties | | Neutralization degree (mole %) | 120 | 120 | 120 | 120 | 120 | 40 |
| | | Slab hardness (Shore D) | 57 | 58 | 59 | 60 | 57 | 53 |
| | | Bending stiffness (kgf/cm$^2$) | 1684 | 2346 | 2567 | 2827 | 611 | 1608 |
| | | Melt flow rate (g/10 min) | 1.0 | 2.0 | 2.0 | 3.6 | 0.3 | 54.8 |
| | | Rebound resilience (%) | 57 | 58 | 57 | 55 | 57 | 49 |
| | | Breaking stress (MPa) | 16.9 | 15.7 | 6.2 | 5.8 | 21.4 | 8.8 |
| | | Breaking strain (%) | 165 | 60 | 10 | 1 | 272 | 5 |
| Golf ball properties | | Thickness of intermediate layer (mm) | 1.0 | 1.0 | 1.0 | 1.0 | 1.0 | 1.0 |
| | | Thickness of cover (mm) | 0.8 | 0.8 | 0.8 | 0.8 | 0.8 | 0.8 |
| | | Compression deformation amount (mm) | 3.12 | 3.06 | 3.02 | 2.96 | 3.14 | 3.34 |
| | | Coefficient of restitution | 0.747 | 0.755 | 0.753 | 0.752 | 0.732 | 0.732 |
| | | Flight distance | P | G | G | G | P | P |
| | | Durability | 150 | 85 | 50 | 50 | 255 | 50 |
| | | Shot feeling | E | E | E | G | E | E |

| | | | | Golf ball No. | 28 | 29 | 30 | 31 | 32 | 33 |
|---|---|---|---|---|---|---|---|---|---|---|
| Intermediate layer composition | Formulation (parts by mass) | (A) | Binary copolymer 1 | | — | — | 100 | 100 | 100 | 100 |
| | | | Binary copolymer 2 | | — | — | — | — | — | — |
| | | | Binary copolymer 3 | | — | — | — | — | — | — |
| | | | Binary copolymer 4 | | — | — | — | — | — | — |
| | | | Ternary copolymer 1 | | 100 | 100 | — | — | — | — |
| | | (B) | Behenic acid | | 68 | 68 | — | 30 | 50 | 30 |
| | | (C) | Oleic acid | | — | — | 90 | 30 | 130 | 90 |
| | | (D') | Tsunodyme 395 | | — | — | 10 | 10 | 30 | 10 |
| | | | Haridimer 250 | | — | — | — | — | — | — |
| | | | Tsunodyme 346 | | — | — | — | — | — | — |
| | | (E) | Oleylbetaine | | — | — | 5 | 5 | 5 | 5 |
| | | (F) | Magnesium hydroxide | | 6.8 | 10.2 | 18.6 | 14.2 | 31.1 | 14.3 |
| | | | Sodium hydroxide | | — | — | — | — | — | — |
| | | | (B) + (C) + (D) | | 68 | 68 | 100 | 70 | 210 | 130 |
| | | | (B)/{(C) + (D)} | | — | — | — | 43/57 | 24/76 | 23/77 |
| | Properties | | Neutralization degree (mole %) | | 80 | 120 | 120 | 120 | 120 | 80 |
| | | | Slab hardness (Shore D) | | 55 | 56 | 54 | 59 | 53 | 54 |
| | | | Bending stiffness (kgf/cm$^2$) | | 1764 | 1950 | 802 | 946 | 873 | 1021 |
| | | | Melt flow rate (g/10 min) | | 26.2 | 3.4 | 2.7 | 2.1 | 4.5 | 9.4 |
| | | | Rebound resilience (%) | | 60 | 57 | 71 | 65 | 68 | 64 |
| | | | Breaking stress (MPa) | | 13.8 | 13.3 | 16.2 | 15.6 | 14.7 | 12.7 |
| | | | Breaking strain (%) | | 11 | 146 | 142 | 121 | 119 | 132 |
| Golf ball properties | | | Thickness of intermediate layer (mm) | | 1.0 | 1.0 | 1.0 | 1.0 | 1.0 | 1.0 |
| | | | Thickness of cover (mm) | | 0.8 | 0.8 | 0.8 | 0.8 | 0.8 | 0.8 |
| | | | Compression deformation amount (mm) | | 3.24 | 3.17 | 3.29 | 3.01 | 3.38 | 3.28 |
| | | | Coefficient of restitution | | 0.753 | 0.748 | 0.756 | 0.752 | 0.756 | 0.751 |
| | | | Flight distance | | G | P | G | G | G | G |
| | | | Durability | | 55 | 115 | 120 | 100 | 100 | 110 |
| | | | Shot feeling | | E | E | E | E | E | E |

(D') includes (D) an unsaturated aliphatic polycarboxylic acid and (C) an unsaturated fatty acid.

TABLE 5

| Cover composition | Formulation (parts by mass) |
|---|---|
| Elastollan | 100 |
| Titanium oxide | 4 |
| Slab hardness (Shore D) | 57 |

The following materials are used in Tables 2 to 5.

Binary copolymer 1: ethylene-methacrylic acid copolymer (content of methacrylic acid: 15 mass %) commercially available from Mitsui-Du Pont Polychemicals Co., Ltd.

Binary copolymer 2: ethylene-methacrylic acid copolymer (content of methacrylic acid: 20 mass %) commercially available from Mitsui-Du Pont Polychemicals Co., Ltd.

Binary copolymer 3: ethylene-methacrylic acid copolymer (content of methacrylic acid: 11 mass %) commercially available from Mitsui-Du Pont Polychemicals Co., Ltd.

Binary copolymer 4: ethylene-methacrylic acid copolymer (content of methacrylic acid: 9 mass %) commercially available from Mitsui-Du Pont Polychemicals Co., Ltd.

Ternary copolymer 1: ethylene-methacrylic acid-butyl methacrylate copolymer (content of methacrylic acid: 8 mass %) commercially available from Mitsui-Du Pont Polychemicals Co., Ltd.

Behenic acid: commercially available from Tokyo Chemical Industry Co., Ltd.

Oleic acid: commercially available from Tokyo Chemical Industry Co., Ltd.

Tsunodyme (registered trademark) 395: (fatty acid composition containing monomer, dimer and trimer of a linear unsaturated fatty acid having 18 carbon atoms (including oleic acid), total content of dimer and trimer: at least 90 mass %, acid value: 195 mgKOH/g) commercially available from Tsuno Co., Ltd.

Haridimer 250: (total content of monomer, dimer and trimer of a linear unsaturated fatty acid having 18 carbon atoms (including oleic acid): at least 90 mass %, acid value: 192 mgKOH/g) commercially available from Harima Chemicals Group, Inc.

Tsunodyme (registered trademark) 346: (fatty acid composition containing monomer, dimer and trimer of a linear unsaturated fatty acid having 18 carbon atoms (including oleic acid), total content of dimer and trimer: at least 90 mass %, acid value: 181 mgKOH/g) commercially available from Tsuno Co., Ltd.

Oleylbetaine: purified product obtained by removing water and salt from "Chembetaine OL" commercially available from The Lubrizol Corporation Magnesium hydroxide: commercially available from Wako Pure Chemical Industries, Ltd.

Sodium hydroxide: commercially available from Wako Pure Chemical Industries, Ltd.

Elastollan (registered trademark): thermoplastic polyurethane elastomer commercially available from BASF Japan Ltd.

Titanium oxide: A220 commercially available from Ishihara Sangyo Kaisha, Ltd.

(3) Production of Intermediate Layer

Golf Balls No. 1 to 15, 21 to 25, and 27 to 33

The intermediate layer (thickness: 1 mm) covering the core was formed by injection molding the intermediate layer composition on the spherical core. The intermediate layer composition was heated to 200° C. to 260° C. at the cylinder part of the injection unit, injected into a mold held under a pressure of 15 MPa, and cooled for 30 seconds. The spherical body having the intermediate layer formed thereon was ejected from the mold. It is noted that the intermediate layers of the golf balls No. 16 to 20 and 26 failed to be produced by the injection molding method since the intermediate layer compositions had a low fluidity.

Golf Balls No. 16 to 20 and 26

The intermediate layer composition in a pellet form was charged into each concave portion of the lower mold of the molds for molding half shells, and compressed to form half shells. The spherical core was concentrically covered with two of the obtained half shells, and compression molded to form the intermediate layer with a thickness of 1.0 mm. The compression molding was carried out at 170° C. for 15 minutes.

(4) Production of Cover and Production of Golf Ball

Extrusion of the cover compositions was carried out under the conditions of screw diameter: 45 mm, screw revolutions: 200 rpm and screw L/D=35. The blended materials were heated to 160° C. to 230° C. at the die position of the extruder. The surface of the obtained golf ball bodies was treated with sandblast, marked, and painted with a clear paint. The paint was dried in an oven at 40° C. to obtain golf balls with a diameter of 42.7 mm and a mass of 45.4 g.

As shown in Tables. 2 to 4, the intermediate layer composition of the golf balls No. 1 to 11 comprises (A) a resin component, (B) a saturated fatty acid, (C) an unsaturated fatty acid and (D) an unsaturated aliphatic polycarboxylic acid, comprises the component (B), the component (C) and the component (D) in a total content ranging from 80 parts by mass to 200 parts by mass with respect to 100 parts by mass of (A) the resin component, and has a neutralization degree of more than 80 mole %. Each of these intermediate layer compositions has excellent rebound resilience and flexibility. Accordingly, each of these golf balls No. 1 to 11 has excellent resilience, flight performance, shot feeling and durability.

The intermediate layer composition of the golf balls No. 12 to 29 does not comprise (D) the unsaturated aliphatic polycarboxylic acid. These intermediate layer compositions have low rebound resilience or breaking strain, or both of low rebound resilience and breaking strain. Accordingly, these golf balls No. 12 to 29 have inferior resilience or durability.

The intermediate layer composition of the golf ball No. 30 does not comprise (B) the saturated fatty acid and thus has low bending stiffness. Accordingly, the golf ball No. 30 has worse resilience. The intermediate layer composition of the golf balls No. 31 and 32 comprises the component (B), the component (C) and the component (D) in a total content of less than 80 parts by mass or more than 200 parts by mass with respect to 100 parts by mass of (A) the resin component, and thus has low bending stiffness and breaking strain. Accordingly, these golf balls No. 31 and 32 have inferior resilience or durability. The intermediate layer composition of the golf ball No. 33 has a neutralization degree of at most 80 mole %, and thus has low rebound resilience and breaking strain. Accordingly, the golf ball No. 33 has inferior resilience.

The golf ball resin composition according to the present invention is preferably used in a constituent member of a golf ball, and is particularly useful for an intermediate layer of a golf ball.

This application is based on Japanese patent applications No. 2015-131213 filed on Jun. 30, 2015, and No. 2016-102349 filed on May 23, 2016, the contents of which are hereby incorporated by reference.

The invention claimed is:

1. A golf ball resin composition, comprising:
(A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester,
(B) a saturated fatty acid,
(C) an unsaturated fatty acid,
(D) an unsaturated aliphatic polycarboxylic acid, and
(E) an amphoteric surfactant;
comprising (B) the saturated fatty acid, (C) the unsaturated fatty acid and (D) the unsaturated aliphatic polycarboxylic acid in a total amount ranging from 80 parts by mass to 200 parts by mass with respect to 100 parts by mass of (A) the resin component; and
having a neutralization degree of more than 80 mole %.

2. The golf ball resin composition according to claim 1, wherein (B) the saturated fatty acid includes a linear saturated fatty acid having 4 to 30 carbon atoms.

3. The golf ball resin composition according to claim 1, wherein (B) the saturated fatty acid includes at least one selected from the group consisting of palmitic acid, stearic acid, arachidic acid, behenic acid, lignoceric acid and montanic acid.

4. The golf ball resin composition according to claim 1, wherein (C) the unsaturated fatty acid includes a linear unsaturated fatty acid having 4 to 30 carbon atoms.

5. The golf ball resin composition according to claim 1, wherein (C) the unsaturated fatty acid includes at least one selected from the group consisting of palmitoleic acid, oleic acid, linoleic acid and arachidonic acid.

6. The golf ball resin composition according to claim 1, wherein (D) the unsaturated aliphatic polycarboxylic acid includes a dimer and/or trimer of a linear unsaturated fatty acid having 4 to 30 carbon atoms.

7. The golf ball resin composition according to claim 1, wherein (D) the unsaturated aliphatic polycarboxylic acid includes a dimer and/or trimer of at least one selected from the group consisting of palmitoleic acid, oleic acid, linoleic acid and arachidonic acid.

8. The golf ball resin composition according to claim 1, wherein a mass ratio [(B)/{(C)+(D)}] of (B) the saturated fatty acid to a sum of (C) the unsaturated fatty acid and (D) the unsaturated aliphatic polycarboxylic acid ranges from 10/90 to 90/10.

9. The golf ball resin composition according to claim 1, wherein (E) the amphoteric surfactant includes at least one selected from the group consisting of a betaine type amphoteric surfactant, an amidoamino acid type amphoteric surfactant, an alkylamino fatty acid salt type amphoteric surfactant, an alkylamine oxide type amphoteric surfactant, a β-alanine type amphoteric surfactant, a glycine type amphoteric surfactant, a sulfobetaine type amphoteric surfactant and a phosphobetaine type amphoteric surfactant.

10. The golf ball resin composition according to claim 1, comprising (E) the amphoteric surfactant in an amount ranging from 1 part by mass to 20 parts by mass with respect to 100 parts by mass of (A) the resin component.

11. The golf ball resin composition according to claim 1, further comprising (F) a metal compound.

12. The golf ball resin composition according to claim 1, having a slab hardness ranging from 20 to 80 in Shore D hardness.

13. A golf ball comprising a constituent member formed from a golf ball resin composition, wherein the golf ball resin composition comprises:
(A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester,
(B) a saturated fatty acid,
(C) an unsaturated fatty acid,
(D) an unsaturated aliphatic polycarboxylic acid, and
(E) an amphoteric surfactant;
comprises (B) the saturated fatty acid, (C) the unsaturated fatty acid and (D) the unsaturated aliphatic polycarboxylic acid in a total amount ranging from 80 parts by mass to 200 parts by mass with respect to 100 parts by mass of (A) the resin component; and
has a neutralization degree of more than 80 mole %.

14. The golf ball according to claim 13, wherein (B) the saturated fatty acid includes a linear saturated fatty acid having 4 to 30 carbon atoms, (C) the unsaturated fatty acid includes a linear unsaturated fatty acid having 4 to 30 carbon atoms, (D) the unsaturated aliphatic polycarboxylic acid includes a dimer and/or trimer of a linear unsaturated fatty acid having 4 to 30 carbon atoms.

15. The golf ball according to claim 13, wherein (B) the saturated fatty acid includes at least one selected from the group consisting of palmitic acid, stearic acid, arachidic acid, behenic acid, lignoceric acid and montanic acid, (C) the unsaturated fatty acid includes at least one selected from the group consisting of palmitoleic acid, oleic acid, linoleic acid and arachidonic acid, and (D) the unsaturated aliphatic polycarboxylic acid includes a dimer and/or trimer of at least one selected from the group consisting of palmitoleic acid, oleic acid, linoleic acid and arachidonic acid.

16. The golf ball according to claim 13, wherein a mass ratio [(B)/{(C)+(D)}] of (B) the saturated fatty acid to a sum of (C) the unsaturated fatty acid and (D) the unsaturated aliphatic polycarboxylic acid ranges from 10/90 to 90/10.

17. The golf ball according to claim 13, wherein the golf ball resin composition comprises (E) the amphoteric surfactant in an amount ranging from 1 part by mass to 20 parts by mass with respect to 100 parts by mass of (A) the resin component.

18. The golf ball according to claim 13, wherein the golf ball resin composition further comprises (F) a metal compound.

19. The golf ball according to claim 13, wherein the golf ball resin composition has a slab hardness ranging from 20 to 80 in Shore D hardness.

* * * * *